(12) United States Patent
Van Der Velden

(10) Patent No.: US 11,503,026 B2
(45) Date of Patent: Nov. 15, 2022

(54) EMAIL ADDRESS WITH IDENTITY STRING AND METHODS OF USE

(71) Applicant: Alexander J. M. Van Der Velden, Atlanta, GA (US)

(72) Inventor: Alexander J. M. Van Der Velden, Atlanta, GA (US)

( * ) Notice: Subject to any disclaimer, the term of this patent is extended or adjusted under 35 U.S.C. 154(b) by 357 days.

(21) Appl. No.: 16/886,317

(22) Filed: May 28, 2020

(65) Prior Publication Data
US 2020/0382501 A1    Dec. 3, 2020

Related U.S. Application Data

(60) Provisional application No. 62/853,235, filed on May 28, 2019.

(51) Int. Cl.
| | |
|---|---|
| *H04L 9/14* | (2006.01) |
| *H04L 29/06* | (2006.01) |
| *H04L 9/40* | (2022.01) |
| *H04L 9/08* | (2006.01) |
| *H04L 9/32* | (2006.01) |
| *H04L 51/56* | (2022.01) |
| *H04L 101/37* | (2022.01) |

(52) U.S. Cl.
CPC ........ *H04L 63/0884* (2013.01); *H04L 9/0866* (2013.01); *H04L 9/3226* (2013.01); *H04L 51/56* (2022.05); *H04L 63/0442* (2013.01); *H04L 63/1483* (2013.01); *H04L 2101/37* (2022.05)

(58) Field of Classification Search
CPC . H04L 63/0884; H04L 9/0866; H04L 9/3226; H04L 51/56; H04L 63/0442; H04L 63/1483; H04L 2101/37; H04L 9/14; H04L 63/08

USPC ............... 713/151, 154, 168, 189; 726/2, 27
See application file for complete search history.

(56) References Cited

U.S. PATENT DOCUMENTS

| | | |
|---|---|---|
| 5,136,643 A | 8/1992 | Fischer |
| 6,401,206 B1 | 6/2002 | Khan et al. |
| 6,904,416 B2 | 6/2005 | Nassiri |
| (Continued) | | |

OTHER PUBLICATIONS

International Search Report and Written Opinion dated Jan. 24, 2019 for corresponding PCT Application No. PCT/US2018/061007.
(Continued)

*Primary Examiner* — Izunna Okeke
(74) *Attorney, Agent, or Firm* — Mathew L. Grell; Grell & Watson Patent Attorneys LLC

(57) ABSTRACT

A system for authentication having an authentication protocol to communicate with the hardware device, the authentication protocol having an encryption function having a hardware key and a software key, a private and a public key pair, the key pair generated from the hardware key and the software key, used to encrypt the communication between the server and the client, an identity authentication service to assign a user of the hardware device to an identity string, and creates a unique user email address based on the identity string and an authentic email server domain, and a target service having a user identity data and comparing the user identity data to the email string, and if the user identity data and the email string match, then the target service accepts the unique user email address to send a service event communication to the hardware device.

16 Claims, 22 Drawing Sheets

ID String Implementation Examples

John Tester
SSN: 559935760
DOB: 11/23/1960

Uniquely Identified

A real person
With SSN 559935760
And DOB 11/23/1960

Encrypted SSN email address
░░░░░░░░@trueme.online

Method to decrypt:
Encode to base 10
Decrypt with key="JTester3"
Format Preserving pyffx
=55993576011231960

From which you can derive link
www.trueme.online/c0f1ebd7f5fb78285822177d6cb9d73c Method to create MD5 hash of
(SSN =559935760+ key=JTester3
+Type of information = image21)

We can now know remotely on the basis of somebody's email how old they are and what they look like

(56) References Cited

U.S. PATENT DOCUMENTS

| | | | |
|---|---|---|---|
| 6,941,455 | B2 | 9/2005 | Aull |
| 7,028,181 | B1 | 4/2006 | McCullough et al. |
| 7,178,029 | B2 | 2/2007 | Ansper et al. |
| 7,178,030 | B2 | 2/2007 | Scheidt et al. |
| 7,475,250 | B2 | 1/2009 | Aull et al. |
| 8,769,622 | B2 | 7/2014 | Chang et al. |
| 9,002,018 | B2 | 4/2015 | Wilkins et al. |
| 9,397,839 | B2 | 7/2016 | Thoniel et al. |
| 9,722,790 | B2 | 8/2017 | Ebrahimi |
| 2002/0143711 | A1 | 10/2002 | Nassiri |
| 2003/0070072 | A1 | 4/2003 | Nassiri |
| 2004/0098589 | A1* | 5/2004 | Appenzeller ......... H04L 9/3073 713/170 |
| 2004/0205243 | A1 | 10/2004 | Hurvig et al. |
| 2008/0209516 | A1 | 8/2008 | Nassiri |
| 2009/0049298 | A1 | 2/2009 | Hatter et al. |
| 2010/0161993 | A1 | 6/2010 | Mayer |
| 2011/0213700 | A1 | 9/2011 | Sant'Anselmo |
| 2013/0227286 | A1 | 8/2013 | Brisson |
| 2015/0356523 | A1 | 12/2015 | Madden |
| 2016/0239653 | A1 | 8/2016 | Loughlin-Mchugh et al. |
| 2016/0360403 | A1 | 12/2016 | Jordi et al. |
| 2016/0373257 | A1 | 12/2016 | Adrangi et al. |

OTHER PUBLICATIONS

SSN Alrerts, Discover Card: https://www.discover.com/credit-cards/member-benefits/security/ssn-newaccount-alerts/ Accessed Jul. 12, 2022.

Raval, Tony; Forbes Technology Council Council Post; Three Anti-Money-Laundering Trends Financial Institutions Should Know in 2019; Forbes: https://www.forbes.com/sites/forbestechcouncil/2019/03/07/three-anti-money-laundering-trends-financial-institutions-should-know-in-2019/#9e7afdc4f194—Accessed Jul. 12, 2022.

* cited by examiner

Target Service Authorization (TrueMe User)
Target Service
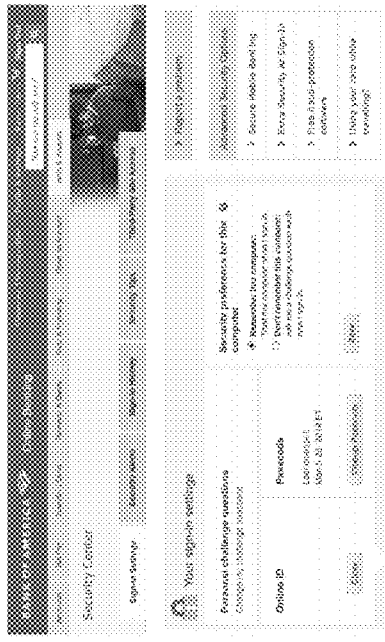
Compare SSN against bank identity record
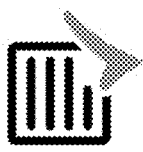
1nim80fdz64@trueme.online
<u>Key</u>
e.g. username 
5598357612   11231960
SSN           DOB
John Tester
Without API or bidirectional interface
FIG. 3-7

Target Service Authorization (Not User)
Target Service
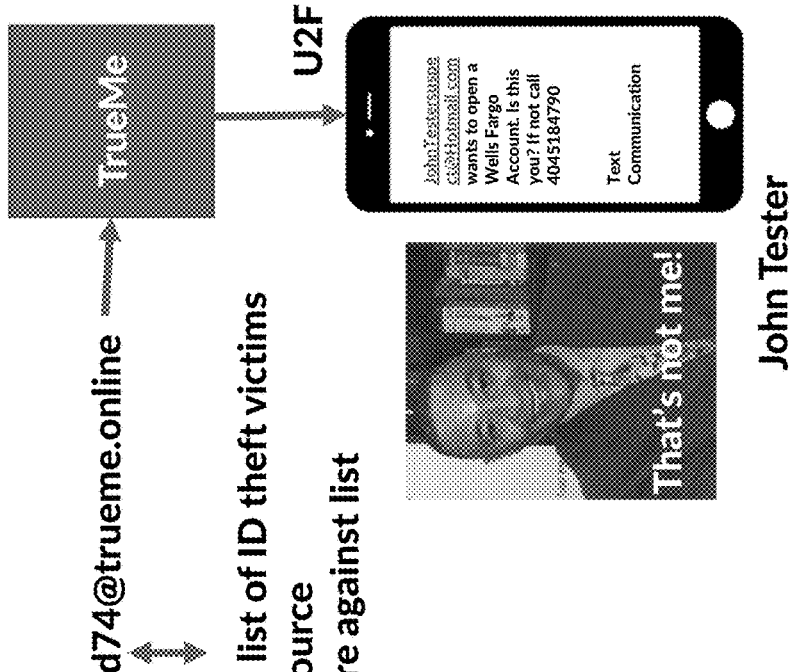
559935760 —base36→ 99dd74@trueme.online
Trueme list of ID theft victims
Open source
Compare against list
U2F
John Tester
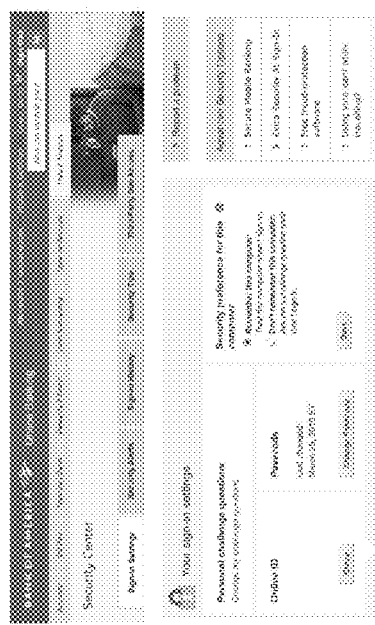
JohnTestersuspect@Hotmail.com
Wants to use 5598357760 SSN
FIG. 3-8

TrueMe™ .online Use Cases

| | Use | ID String (e.g. SSN) Implementation | Other operations |
|---|---|---|---|
| 1 | Monitor Real-time Account Takeover | Plain or encoded use in local part of email address | Message parsing |
| 2 | Block Phishing | | Message filtering |
| 3 | Remote User Verification | Plain or encoded or encrypted use in local part of email address | |
| 4 | Remote User Attribute only Verification | Hash use in local part of email address | attribute encoded or encrypted in local part email address |
| 5 | Block New Account Fraud | Plain or encoded use in local part of email address | |
| 6 | Single Contact GDPR | Plain or encoded use in local part of email address | |
| 7 | In Person Attribute Verification | Hash use in data link | |
| 8 | In Person User Verification | Plain or encoded use in data link | |
| 9 | Person-to-Person true & non-sensitive data | Plain, or encoded with key forwarding | |
| 10 | Person-to-Person true & non-sensitive data | Public private key encryption | |

FIG. 3-12

TrueMe™.online Use Case Dependencies

| | Use Cases | Dependency on Target Service (e.g. Bank) |
|---|---|---|
| 1 | Monitor Real-time Account Takeover | Support outgoing email contact |
| 2 | Block Phishing | None |
| 3 | Remote User Verification | Implement open source code, email contact |
| 4 | Remote User Attribute only Verification | Implement open source code, email contact |
| 5 | Block New Account Fraud | Implement open source code, email contact |
| 6 | Single Contact GDPR | Implement open source code, bi-directional messaging |
| 7 | In Person Attribute Verification | Implement open source code, bi-directional messaging |
| 8 | In Person User Verification | Implement open source code, bi-directional messaging |
| 9 | Person-to-Person true & non-sensitive data | None |
| 10 | Person-to-Person true & non-sensitive data | 2nd person also needs to be join Trueme |

FIG. 3-13

TrueMe™.online Implementation Feature Vs Function

| | Feature | Function |
|---|---|---|
| 1 | Portal from TrueMe to authentication service (like postident) | You are authenticated to controlling your device and your email address/phone number is authenticated to your identity data. |
| 2 | Verification of email address by target service (like bank) | You are verified to controlling the email address of step 1. |
| 3 | Open standard decoding by target service of trueme email address | The data decoded from the email address can be assumed to belong to the owner of the email address if step 1,2 are followed. |
| 4 | Encoding of the trueme email address by the target service on the basis of account information. | The owner of the trueme identity can monitor events sent to this email. |
| 5 | Open standard decoding of QR & verification of decoded sms number by target service | The data decoded from the device with the QR including the phone number can be assumed to be true if data is retrieved from true me server. |
| 6 | | |
| 7 | | |
| 8 | | |

FIG. 3-14

TrueMe™ .online Data

| Verification Data | Identity string data |
|---|---|
| 1 | SSN, National Identification No. | SSN, National Identification No. |
| 2 | Drivers License | Drivers License |
| 3 | 9 Digit ZIP Code | Address to within a few houses |
| 4 | Phone number | Phone number |
| 5 | Credit card number | Credit card number |
| 6 | Insurance card number | Insurance card number |
| 7 | 7 digits of DOB | DOB |
| 8 | Country Code | Country Code |

FIG. 3-15

TrueMe™.online FAQ

| # | Question | Answer |
|---|----------|--------|
| 1 | The root email is encoded. This means anybody could target somebody with a specific SSN by sending them an email | Yes, but TrueMe filters email against any domains that are not target service providers. Also the messages are parsed for specific events (e.g. "login"). Messages that do not follow this format but are not likely spam or phishing will be forwarded to an alternate email account. Server has been verified to belong to target service. Trueme email is not meant for regular communication. |
| 2 | They could hack your TrueMe service and steal my SNN | TrueMe only keeps the identity string. The root identity string does not contain your name. You can set any attributes to be encrypted by a string that only you know on your device only (including your name) and that is only shared with the 3$^{rd}$ party authentication service, not TrueMe. So at best the hackers would get a SSN that are owned by someone who is the victim of identity theft. This is something that is already public knowledge * |

Notes: * https://www.discover.com/credit-cards/member-benefits/security/ssn-newaccount-alerts/ *We'll notify you if your Social Security number is found on any of thousands of Dark Web sites.*

FIG. 3-16

TrueMe™.online FAQ

| | Question | Answer |
|---|---|---|
| 3 | Experian and others already offer services whereby they warn you if your SSN is being used for a new account | Yes, and you could of course pay to monitor your credit as well and do this yourself. In the case of credit, I have observed that even though monitoring was in place accounts were opened in my name that were not reported. In addition, in my case vast majority of fraud is not due to new credit accounts but new bank or other accounts **. These accounts (brokerage, bank) are used for money laundering. They won't steal your money, but cleaning up the mess will be a lot of grief. |
| 4 | If you give a list of encoded SSN of ID theft victims who are members of TrueMe to the banks or make it open source, ID thieves can steal this list to further victimize. | So at best the hackers could decode a list of SSN that are owned by people who are victims of identity theft. However, this list does not contain names. This is something that is already public knowledge * <br> There is no need to keep a SSN secret, only the combination of name/SSN should be held secret. |

Notes:
* https://www.discover.com/credit-cards/member-benefits/security/ssn-new-account-alerts/ We'll notify you if your Social Security number is found on any of thousands of Dark Web sites.
** https://www.forbes.com/sites/forbesfinancecouncil/2019/03/07/three-anti-money-laundering-trends-financial-institutions-should-know-in-2019/#6e7a6cd4f134

FIG. 3-17

Sign up for Yahoo Mail

Create a Yahoo email address

John  Testcase

BE85D1E256953469 @yahoo.com

I want to use my current email address

••••••••

+1  ▾  (404) 519-8187

November  ▾  23  1960

Gender (optional)

By clicking "Continue", you agree to the Terms and Privacy Policy

Continue

Already have an account? Sign in

FIG. 4

EMAIL ADDRESS WITH IDENTITY STRING AND METHODS OF USE

CROSS REFERENCE TO RELATED APPLICATIONS

To the full extent permitted by law, the present United States Non-provisional patent application hereby claims priority to and the full benefit of, United States Provisional application entitled "Email Address with Identity String and Methods of Use," having assigned Ser. No. 62/853,235, filed on May 28, 2019 which is incorporated herein by reference in their entirety.

TECHNICAL FIELD

The disclosure relates generally to a cryptography and security system to identify and authenticate individuals and, more specifically, to improve, simplify, and facilitate digital identity authentication, verification, control, and ownership in a secure and efficient manner between a number of parties.

BACKGROUND

Prior to modern commerce and during the agrarian small town or village era, identification and authentication of an individual was relatively simple since everyone knew the other members of the community. In modern times and especially with the advent of the Internet, digital identification and authentication of an individual has become subject to fraud and identity thieves. Often victims of identity theft do not know something is stolen.

Every year approximately 16 million Americans are victim to identity theft and an estimated $16B in direct losses occur. The majority of identity theft victims do not suffer any financial losses; however, they do experience significant loss of time and costs to reestablish their identity with various institutions. According to the Federal Trade Commission (FTC), identity theft accounts for about $54 billion in direct and indirect costs to U.S. businesses and individuals every year. The Center of Strategic and Global studies estimated a startling $600 billion annually in 2018. The figures include direct and indirect costs such as those associated with lost revenue, customers, and lost opportunities.

The current problems find their origin in the application of military security technology without proper understanding of context of the original application as well as permissive personal data laws in the United States. The military broke verifying the identity of a remote individual, into a two part inquiry: i) the party or device performing the identification must have identifying information of the individual available to match or check against the information submitted by the individual; and ii) to secure and protect the identifying information of the individual from hacking, forgery, or fraudulent use by querying a central file from a trusted issuer of verified identification credentials.

By itself this identity verification process is incomplete since the risk of fraud in case of face-to-face is different than remote. Somebody can remotely provide identity verification information to you (e.g. Social Security Number), but that verification has nothing to do with the fact that the remote person is actually who you think he/she is. Many entities deploying a centralized computer system adopted this approach for on-line authentication without asking themselves whether they are an unconditionally trusted issuer of validated identification credentials.

This approach in practice works for the data center of the nuclear arsenal where this approach was developed because the network was only accessible by people with security clearances who have to submit to a face-to-face inspection entering the facility.

This approach in practice works for financial transactions because the person entering the transaction works for the bank and most often has no interest in falsifying transactions.

The principal weakness of this approach, both at military installations and financial institutions, occurs when insiders with security access to the facility assume the identity of other members with similar access (e.g. Edward Snowden) with stolen passwords.

Online services adopted the same identification technology by implementing a centralized computer facility which issues verified security credentials. However, they allowed the individual user to enter their own identity information without any face-to-face authentication.

Problem 1: identity theft problem and why it is not solved. Identity is determined using three factors: Who you are (your physical person), what you have (physical key), and what you memorized (password). For online identity typically passwords are used as a surrogate for what you can memorize. The problem is two-fold:

a—Once a password is established, it has to be known by two parties, you and the online service and has to be recorded and stored by the online service. Every internet service can be hacked, even those services run by security experts, so passwords can be stolen. Therefore passwords are no longer something that only you know. Fundamentally this is an unsolvable problem; therefore, passwords by themselves are not a viable way to establish identity. The same is true for pins, social security numbers, freeze pin numbers, mother's maiden name and any other identification info or answer to challenge question that is stored in databases. This problem is compounded by the fact that in the US the data in the database does not belong to the individual, but to the online company. So the individual cannot hold the online company liable for identity theft.

b—Once an account with passwords is established everybody is free to define his identity any way they see fit. Therefore it is very easy to impersonate somebody else using stolen identity data, or create a synthetic identity. Once you have done that, you can easily change this identity further to suit your needs (e.g. change address, email).

Known criminal uses of identity theft are:

Use of medical records to obtain drugs, pay for medical procedures, and take over identity more broadly.

Money laundering. Use your account to (try to) funnel criminal proceeds (e.g. drug sales)

Online impersonation. Using known video recordings, synthetic computer generated avatars of people (mainly executives) are created that engage in online meetings and authorize money transactions.

Gaining access to US critical infrastructure (cyberattack of potentially about 80,000 installations) through the potential impersonation of 1,000,000 key US individuals Establishing new credit in your name and stealing money Since the primary identity data (e.g. individual Social Security Numbers) of the majority of the US population is stolen, identity management compliance processes are becoming more dependent on data purchased from data aggregators (list of identity verification questions), which are not immediately retrievable by memory by the bona-fide person, such as exact bank balances or incorrect data, such as wrong dates-of-birth, expired driver's license number, and the like. Moreover, this data itself is likely in the hands of identity thieves as well, providing the identity thieves with the same path to identification and authentication as the bona-fide person. Additionally, there is no financial consequence if the service provider loses identity data or holds incorrect identity data rather the loss of time and costs to reestablish an individual's identity with various institutions lies with the individual.

Furthermore, apart from direct and indirect losses, there is an emotional aspect to being a victim to identity theft. There is nothing more aggravating than having your own identity rejected based on a flawed compliance process.

The cost in lost transactions due to false positives (rejected passwords) in fact far exceeds the direct losses. In addition, identity verification with online-services now relies on credentials (user id and passwords). Many individuals now have a hundred passwords that each need to be updated frequently. If administrators force end-users to use difficult to remember passwords they will typically have to store them separately in files which again decrease security, and if administrators don't do that, users pick passwords that can be easily guessed.

Moreover, whenever identity data, such as lists of identity verification questions and answers, driver's license number, government issued ID, Social Security number, date of birth, place of birth, maiden names, user IDs, passwords, and any hard to guess personal information such as "what was the name of your first pet" is centrally stored and resold, it again becomes subject to hacking.

Problem 2: identity recording errors and why it is not solved. When your invariant identity is recorded by third parties unknown to the owner of the identity, often errors are made. This can lead to bureaucratic confusion and thus additional cost and time. For instance inventors own formal name Alexander Jacobus Maria Van der Velden or common name Alex (first name) Van der Velden (last name) leads to a lot of problems. Errors cause my last name being Van, Der, Der Velden or just Velden. Sometimes the V is replaced by a B, so it becomes Belden or Balden due to misspelling. Also this sometime triggers undesired legal activity, an example is an erroneous change of the warranty deed from Alexander J. M. Van der Velden to Alex J. M. Van der Velden. This in turn caused a one week delay during a refinance because the nature of the new deed was not understood.

There is no reason why there should be so many instances of what is in fact invariant identity data. The problem is that every organization tracks their own version of this invariant information in databases by human data entry. Even under the best of circumstances humans may make a data entry error approximately every 30 words. A consistent recording and review of variant and invariant identity data for online identities would be most welcome.

Problem 3: Fraudulent profiles and why it is not solved. When you set up an online account, you are free to define your identity any which way you want. This may be desirable for some, but today a large fraction of online profile data is fake. In the case of online-dating applications, it is estimated that losses exceeding $200 million with dating fraud with only 15% reporting such losses. Moreover, it is further estimated that millions of social media accounts are not people but robots trying to manipulate sentiment and public opinion. Currently companies are using analytics to try to catch such scams, but this obviously isn't very successful as the bots can be trained to avoid being detected by analytics. This makes all of us vulnerable to manipulation and this may undermine our democracy itself.

There would be a market for a service whereby the profile data for online services would be actually representing the true identity data. If something like this were available honest people would use the service and scammers would be left in a smaller pool by themselves.

Problem 4: Fraudulent corporate roles and why it is not solved. Businesses define roles for their employees in order to control who can execute transactions on behalf of the business. The problem occurs when these roles are communicated informally within the business, such as through phone conversations or through badges. Such approaches are not traceable and are not secure means of executing transactions on the behalf of the business since badges, emails and phone calls can be easily faked. For example, in September 2015 criminals stole a freightliner truck and were able to enter Montreal port with fake identification. They then went on to load a container with 16 tons of silver on their truck and disappear. Three hundred and fifty security cameras did not prevent this theft.

Therefore, it is readily apparent that there is a recognizable unmet need for an Email Address with Identity String and Methods of Use designed to address at least some of the aspects of the problems discussed above.

BRIEF SUMMARY

Briefly described, in an example embodiment, the present system and method may overcome the above-mentioned disadvantages, and may meet the recognized need for a system for digital identity authentication including, in general, a system for an Email Address with Identity String. The system for an Email Address with Identity String may include a computer system or platform to improve, simplify, and facilitate digital identity authentication, verification, control, and ownership in a secure and efficient manner between a number of parties. This disclosure is different from companies doing authentication (e.g. Postident, Idology etc.) and those who aggregate personal data for companies (e.g. Equifax etc.). This disclosure leverages existing authentication services by having them authenticate your identity based on control over a device and ownership of the email address.

Accordingly, a feature of the system for Email Address with Identity String and methods of use for digital identity authentication, said system having a server for data and email, a client on a hardware device in communication with said server, said server having an authentication protocol to communicate with said hardware device, said authentication protocol having an encryption function having a hardware key and a software key, a private and a public key pair, said key pair generated from said hardware key and said software key, used to encrypt the communication between said server and said client, an identity authentication service to assign a user of said hardware device to an identity string, and creates a unique user email address based on said identity string and an authentic email server domain, and a target service having a user identity data and comparing said user identity data to said email string, and if said user identity data and said email string match, then said target service accepts said unique user email address to send a service event communication to said hardware device.

In an exemplary embodiment of a computer system to provide digital identity authentication, the computer system may include: a memory device for storing an instruction; a processor in communication with the memory and configured to execute the instruction on the processor; a server for data and email, a client on a hardware device in communication with said server, said server having an authentication protocol to communicate with said hardware device, said authentication protocol having an encryption function having a hardware key and a software key, a private and a public key pair, said key pair generated from said hardware key and said software key, used to encrypt the communication between said server and said client, an identity authentication service to assign a user of said hardware device to an identity string, and creates a unique user email address based on said identity string and an authentic email server domain, and a target service having a user identity data and comparing said user identity data to said email string, and if said user identity data and said email string match, then said target service accepts said unique user email address to send a service event communication to said hardware device.

In an exemplary embodiment of a method of providing digital identity authentication, the method utilizing a computer processor to execute an instruction may include the steps of providing a server for data and email, a client on a hardware device in communication with said server, said server having an authentication protocol to communicate with said hardware device, said authentication protocol having an encryption function having a hardware key and a software key, a private and a public key pair, said key pair generated from said hardware key and said software key, used to encrypt the communication between said server and said client, utilizing an identity authentication service to assign a user of said hardware device to an identity string, creating a unique user email address based on said identity string and an authentic email server domain, enabling a target service to access a user identity data, comparing said user identity data to said email string by said target service, and if said user identity data and said email string match, and accepting said unique user email address to send a service event communication via said target service to said hardware device.

Accordingly, a feature of the system for Email Address with Identity String and methods of use is that the system represents the user you the member only and since the member is the one that pays for identity losses. E.g. 40 million US ID theft victims.

Another feature of the system for Email Address with Identity String and methods of use is that the system is that the system makes sure nobody except for the user is associated with your data and specifically your contact information such as your email address.

Still another feature of the system for Email Address with Identity String and methods of use is that the system is that the system to provide digital identity authentication and methods of use may include 3rd parties are only disclosed relevant things about you. (A waiter does not need to know where you live in order to check if you are 21, and then take your credit card as well).

Yet another feature of system for Email Address with Identity String and methods of use is that the system segregates 3rd parties needing disclosed relevant things about a user. (A waiter does not need to know where you live in order to check if you are 21, and then take your credit card as well).

Yet another feature of the system for Email Address with Identity String and methods of use is that the system does not require a bidirectional interface with Target Service know email addresses if the hashing algorithm is known (very minor back-end modification). Moreover, no development contracts or API integration system is required.

Yet another feature of the system for Email Address with Identity String and methods of use is that the Email address itself will be encrypted with target service (part) login credentials (username or password) as a key.

Yet another feature of the system to provide digital identity authentication and methods of use may be its ability to provide the identity server in a container and deployed as an identity license server to a third party service.

Yet another feature of the system for Email Address with Identity String and methods of use may include its ability to provide digital content that is marked with a digital signature (aka digital watermark) by the identity server including name, and/or public identifier of the verified person who uploaded the content.

Yet another feature of the system for Email Address with Identity String and methods of use may include its ability to provide content that can only be decrypted by a verified and logged in owner-user of the content.

Yet another feature of the system for Email Address with Identity String and methods of use may include the ability to create digital identity authentication software smartphone app whereby specialized smartphone hardware is the hardware key.

Yet another feature of the system for Email Address with Identity String and methods of use may include the ability to utilize a purely biometric identification (like facial). The hardware key is the motherboard with the face recognition sensor. The software key is generated from sample images of your face itself during setup of the phone.

Yet another feature of the system for Email Address with Identity String and methods of use may include the ability to provide the population at large (users, individuals, identity editors, requestor and the like) a means to search for their identity using their fixed format public identifier (e.g. Social Security number, other identifier, or its hash) to see if someone fraudulently registered them or, proactively they may register to temporarily freeze (frozen) their identity. This means that their public identifier can no longer be used as identification in this system for transactions involving identity theft. Moreover, this brings a large part of the population into the system initially wherein public identifiers (such as social security numbers) may be initialized in the platform in a freeze status until user registers an active account. This freeze process can also be done with remote identity editor services. Any identity freeze conflicts based on the same public identifier can be resolved through hierarchical processes of in-person verification.

Yet another feature of the system for Email Address with Identity String and methods of use may include the ability to provide the service for free to requestors and paid for by individuals who seek to protect their identity.

Yet another feature of the system for Email Address with Identity String and methods of use may include the ability to utilize variations in the integration of known encryption technology for authentication, message integrity, encryption, encryption key exchanges systems and methods, U2F, block chain, and other like digital identity, digital signature, digital document, or other secure communication and data exchange protocols, and the like function and manner of operation, assembly and use, are intended to be encompassed by the present disclosure.

Yet another feature of the for Email Address with Identity String and methods of use may include its ability to provide individual identity and age and residency authentication to online gaming, age restricted products and FOSTA-SESTA (age verification technologies to protect children online).

Yet another feature of the system for Email Address with Identity String and methods of use may include its ability to provide individual identity and authentication vendors ("know your vendor") and registers bona fide sales people of products and services for companies. Companies get lots of calls with people trying to sell them something or people claiming relationships to existing vendors. Some of these callers are scammers trying to convince you to pay invoices to fraudulent bank accounts.

Yet another feature of the for Email Address with Identity String and methods of use may be its ability to meet HIPAA Privacy Rules for Patients' Rights, including HIPPA 3b and 3d to prevent medical identity theft, keep treatment and diagnosis as accurate as possible, and while maintain privacy and security of patient. Patient has the right to access their own medical records, and request their records across hospitals and doctors, as well as record forwarding from one doctor to the next, so patient both individual and requestor role and will have access to his data across medical service providers. Patient may register their insurance data as an additional piece of variant identity data via identity editor. Medical administrator's may author, add to record, and sign/encrypt the data with their private key, and may act in the identity editor role. Patient may want to provide other medical doctors, pharmacy, hospital administrator, or lawyers' (requestor) access to data, so in this case other medical doctors/lawyers/insurance companies are requestors. In the case whereby somebody other than the patient owns the data (covered entity) then the paired account is between the doctor and this covered entity. Medical identity theft occurs when someone uses an individual's name and personal identity to fraudulently receive medical services, prescription drugs and/or goods, including attempts to commit fraudulent billing. Medical identity theft incidents increased 21.7 percent in 2017, and it is estimated that 1% of procedures in the USA are billed to fake person using somebody else's insurance. Medical identity theft can cause delays in treatment, misdiagnosis and inappropriate care. The health data of the imposter is merged with the identity of the real patient, creating serious inaccuracies in health data. Prescription drug loopholes can be closed by adding medicine delivery where requestor (pharmacy or online pharmacy and delivery person) authenticates individual prior to release of prescription.

Yet another feature of the system for Email Address with Identity String and methods of use may include the ability to provide remote sign-off for package delivery from one unique individual (public identifier) to another where individual signs off remotely to where the package gets delivered by the delivery service.

Yet another feature of the system for Email Address with Identity String and methods of use may include the ability to provide remote sign-off or to sign a transaction between one unique individual (public identifier) and another(s) where the individual signs the transaction remotely.

Yet another feature of the system for Email Address with Identity String and methods of use may include its ability to provide requestor (delivery person) on behalf of Seller (AMAZON, WALMART, or the like) authentication of individual (Buyer) prior to release of goods/services and delivery confirmation that goods/services were shipped and delivered.

Yet another feature of the for Email Address with Identity String and methods of use may include its ability to provide e-commerce site identification and verification of buyer at checkout and verify buyer's identity and address, as well as forwarding credit card strings for payment and shipments of goods/services.

Yet another feature of the for Email Address with Identity String and methods of use may include its ability to provide in-store identification and verification of buyer and verify buyer's identity or buyer's authorized agent to accept goods/services on their behalf.

Yet another feature of the system for Email Address with Identity String and methods of use may include its ability to provide in-store identification and verification of buyer and verify buyer's age and residency for restricted products such as alcohol, tobacco, firearms (and check felon database), lottery tickets and the like.

Yet another feature of the for Email Address with Identity String and methods of use may include its ability to provide verification and authentication for banking or other financial transactions, such as ATM usage.

Yet another feature of the system for Email Address with Identity String and methods of use may include its ability to provide verification and authentication for voting or voter registration.

for Email Address with Identity String and methods of use to provide digital identity authentication and methods of use may include its ability to provide verification and authentication for credit reporting agencies.

Yet another feature of the system for Email Address with Identity String and methods of use may include its ability to provide verification and authentication for gambling, alcohol, vaping, marijuana, and other age identification and verification services.

Yet another feature of the system for Email Address with Identity String and methods of use may include its ability to provide verification and authentication for online ads and adult content, services, or products.

Yet another feature of the system for Email Address with Identity String and methods of use may include its ability to provide voter authentication, verification, and security. The system may authenticate a user before casting a vote or absentee ballot with a user's updated or recent identity contract. Display thereon a voter dashboard an increment in candidates tally when user's vote is cast to verify an accurate vote count to the user. Moreover, the digital identity authentication system may enable secure mobile and/or online voting to enable all citizens to easily cast their vote remotely while preventing unauthorized or fraudulent voters from participation.

These and other features of the system to provide Email Address with Identity String and methods of use will become more apparent to one skilled in the art from the following Detailed Description of exemplary embodiments and Claims when read in light of the accompanying drawing Figures.

BRIEF DESCRIPTION OF THE DRAWINGS

The present system to provide Email Address with Identity String and Methods of Use will be better understood by reading the Detailed Description of exemplary embodiments with reference to the accompanying drawing figures, in which like reference numerals denote similar structure and refer to like elements throughout, and in which:

FIGS. 3-1 to 3-17 are slides of a power point presentation of an exemplary embodiment of the Email Address with Identity String and Methods of Use of an email system based on email having an encoded, hash, or encrypted local part with an ID string of the present disclosure for use with computer systems of FIGS. 1 and 2;

FIG. 4 is an exemplary embodiment of a screen shot of an email signup form to create a new email address with Email Address with Identity String integrated therein, as shown in FIG. 3;

FIG. 5 is an exemplary embodiment of change over of contact email with target service to Email Address with Identity String integrated therein, as shown in FIG. 3;

FIG. 6 is an exemplary embodiment of a confirmation email responses from target service that new Email Address with Identity String integrated therein is user's new contact email, as shown in FIG. 3.

Figure 1:
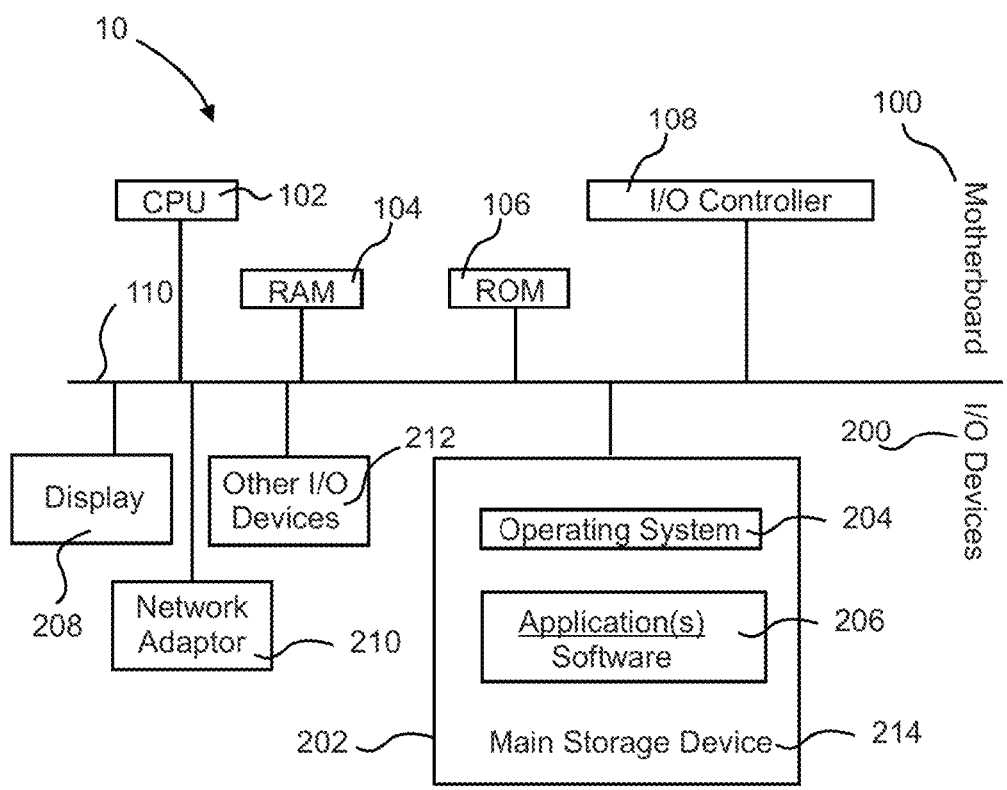
FIG. 1 is a block diagram of a computer system according to select embodiments of the present disclosure of a bet information advisor platform.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-6, specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples, and are merely examples among other possible examples.

In order to understand the present disclosure certain variables and terms need to be defined, such as "Identity Verification", "Identity Validation" and "Identity Authentication", which are often used interchangeably, but actually have subtle differences in meaning.

Identity (data) Validation means ensuring that identity data represents real data, for example ensuring that a particular Social Security Number has not been issued by the Social Security Administration to another individual.

Identity (data) Verification means ensuring that identity data is associated with a particular individual, for example matching date of birth and address to an individual's name.

Identity (person) Authentication refers to a process of determining that an individual is who they claim to be by a comparison of a passport picture (or other government issued document and credentials) with visual inspection of the person handing over the passport.

As will be appreciated by one of skill in the art, the present disclosure may be embodied as a method, data processing system, or computer program product. Accordingly, the present disclosure may take the form of an entirely hardware embodiment, entirely software embodiment or series of instructions or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instruction(s) or operation(s). These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer, provide software as a service, or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations or provided as computer application, software, software platform, software as a service.

Computer programming for implementing the present disclosure may be written in various programming languages, database languages, and the like. However, it is understood that other source or object oriented programming languages, and other conventional programming language may be utilized without departing from the spirit and intent of the present disclosure.

Moreover, hardware-based computer systems, which perform the specified functions or steps, or combinations of special purpose hardware and computer instructions or operations or provided as computer application, software, software platform, software as a service for authentication and identification communication, including biometric authentication, between an authentication provider, a service provider or requestor, and a consumer or user, for facilitating authentication and identification communication, including biometric authentication, between an authentication provider, a service provider or requestor, and a consumer or user, for providing alerts and notifications regarding potential fraud and potential identity theft, for arranging secure authentication of personal data or the ability to watermark users data (marked with a digital signature including name, and/or invariant of the verified user who uploaded the content), such as data in requests to open banking, credit, credit card, loan, financial, telecommunications and utility accounts; DNA services, honest advertising, honest news (true identification of reports to news stories to prevent fake news)—publishing content under user's name/invariant, protecting generic data/information, individual is allowed to view/share/encrypt/decrypt their data on a 3rd party system) including FACEBOOK, YAHOO, GOOGLE DRIVE, DROP BOX, IRS, IRS's individual taxpayer authentication numbers, and the like.

Moreover, computer programming and hardware for implementing the present disclosure may be in the form of a piece of licensing hardware and/or software or deployed as an identity license server to 3rd parties who can then use it to register, identify and authenticate individuals or individual access.

Referring now to FIG. 1, there is illustrated a block diagram of a computer system 10 that provides a suitable environment for implementing embodiments of the present disclosure. The computer architecture shown in FIG. 1 is divided into two parts—motherboard 100 and the input/output (I/O) devices 200. Motherboard 100 preferably includes subsystems or processors to execute an instruction(s) such as central processing unit (CPU) 102, a memory device, such as random access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computer system 10 further preferably includes I/O devices 202, such as main storage device 214 for storing operating system 204 and instructions or application program(s) 206, and visual display or monitor, such as display 208 for displaying visual output, and other I/O devices 212 as appropriate. Main storage device 214 preferably is connected to CPU 102 through a main storage controller (represented as 108) connected to bus 110. Network adapter 210 may allow the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

The plurality of memory components 104, 106 may be embodied on a single computing device 10 or distributed across a plurality of computing devices. In various embodiments, memory may comprise, for example, a hard disk, random access memory, cache memory, flash memory, a compact disc read only memory (CD-ROM), digital versatile disc read only memory (DVD-ROM), an optical disc, circuitry configured to store information, or like hardware, or some combination thereof. Memory 104, 106 may be configured to store information, data, applications, instructions, or the like for enabling the computing device 10 to carry out various functions in accordance with example embodiments discussed herein. For example, in at least some embodiments, memory 104, 106 is configured to buffer input data for processing by processor 102. Additionally or alternatively, in at least some embodiments, memory 104, 106 may be configured to store program instructions for execution by processor 102. Memory 104, 106 may store information in the form of static and/or dynamic information. This stored information may be stored and/or used by the computing device 10 during the course of performing its functionalities.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1 to be present to practice the present disclosure, as discussed below. Furthermore, the devices and subsystems may be interconnected in different configurations from that shown in FIG. 1, or may be based on optical or gate arrays, or some combination of these elements that is capable of responding to and executing instructions or operations. The operation of a computer system such as that shown in FIG. 1 is readily known in the art and is not discussed in further detail in this application, so as not to overcomplicate the present discussion.

In some embodiments, some or all of the functionality facilitating email exchanges and/or transactions may be performed by processor 102. In this regard, the example processes and algorithms discussed herein can be performed by at least one processor 102. For example, non-transitory computer readable storage media can be configured to store firmware, one or more application programs, and/or other software, which include instructions and other computer-readable program code portions that can be executed to control processors of the Email Address with Identity String and System or Platform 201 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatuses circuitry to produce a machine, such that the computer, processor or other programmable circuitry that executes the code may be the means for implementing various functions, including those described herein.

Figure 2:
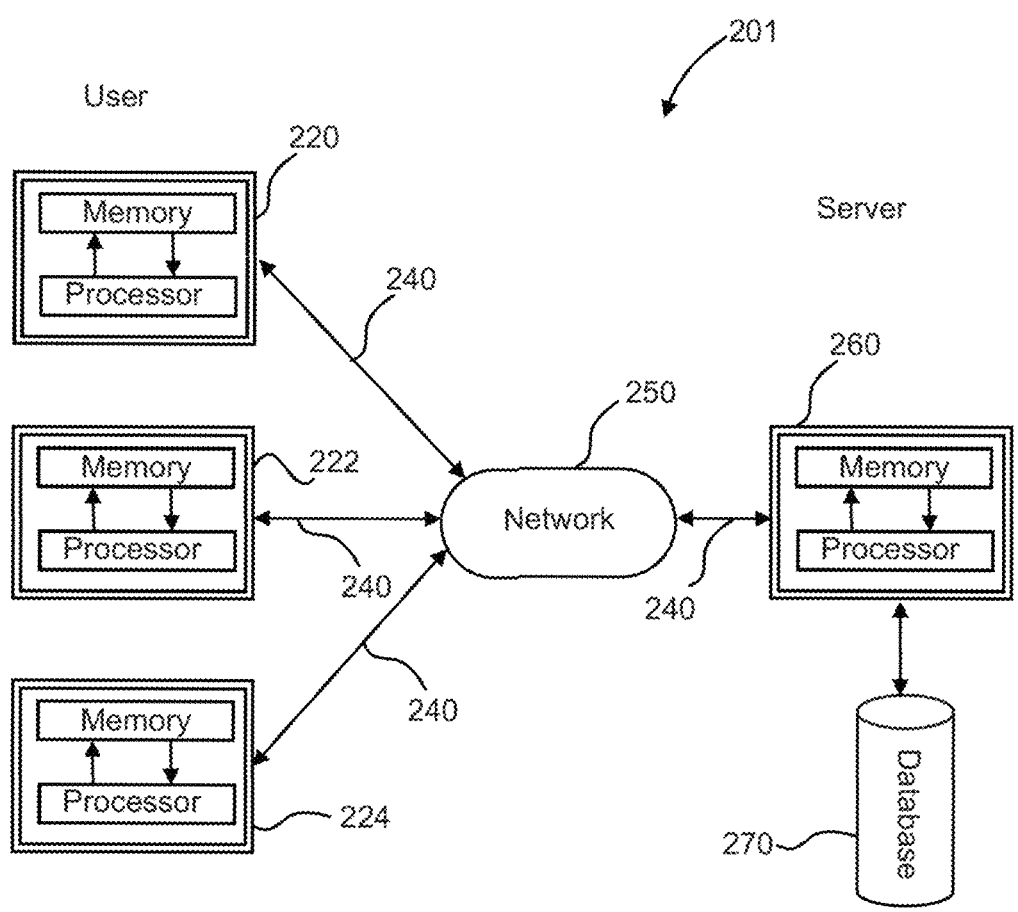
FIG. 2 is a block diagram of select embodiments of a communications system implemented by the computer system in FIG. 1.

Referring now to FIG. 2, there is illustrated a diagram depicting an exemplary communication system or platform 201 in which concepts consistent with the present disclosure may be implemented. Examples of each element within the communication system or platform 201 of FIG. 2 are broadly described above with respect to FIG. 1. In particular, the server system 260 and user 220, 222, 224 have attributes similar to computer system 10 of FIG. 1 and illustrate one possible implementation of computer system 10. Communication system or platform 201 preferably includes one or more user 220, 222, 224, one or more server system 260, and network 250, which could be, for example, the Internet, public network, private network or cloud. User 220, 222, 224 each preferably includes a computer-readable medium, such as random access memory, coupled to a processor, and may be a standalone system, such as a kiosk. The processor, CPU 102, executes program instructions or operations stored in memory. Communication system or platform 201 typically includes one or more user 220, 222, 224. For example, user 220, 222, 224 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, hand held data capture and communications device, such as Delivery Information Acquisition Device (DIAD) or Power Pad, a component, other equipment, or some combination of these elements that is capable of responding to and executing instructions or operations and capturing and transmitting data.

Similar to user 220, 222, 224, server system 260 preferably includes a computer-readable medium, such as random access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1. Server system 260 may additionally include a secondary storage element, such as database 270 for storage of data and information. Server system 260, although depicted as a single computer system, may be computer-implemented as a network of computer processors. Memory in server system 260 contains one or more executable steps, program(s), algorithm(s), or application(s) 206 (shown in FIG. 1). For example, the server system 260 may include a web server, information server, application server, one or more general-purpose computers (e.g., personal computers), one or more special purpose computers (e.g., devices specifically programmed to communicate with each other), a workstation, a distributed system, a chain of server-less microservices processors, a custom built hardware module, or other equipment, or some combination of these elements that is capable of responding to and executing instructions or operations. Moreover, devices shown in FIG. 2 may include communication, processing, and storage means developed in the future.

It is contemplated herein that communication system or platform 201 may be implemented on a custom built hardware device.

Communications system or platform 201 is capable of delivering and exchanging data between user 220, 222, 224 and a server system 260 through communications link 240 and/or network 250. Through user 220, 222, 224, users can preferably communicate over network 250 with each other user 220, 222, 224, and with other systems and devices, such as server system 260, to electronically collect, transmit, manipulate, display, store, print and/or view bettor data utilizing betting level of profitability system 301 (see FIG. 3). Communications link 240 typically includes network 250 making a direct or indirect communication between the user 220, 222, 224 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, print and/or view. The communications link 240 may include, for example, a wired, wireless, cable, optical or satellite communication system or other pathway.

It is contemplated herein that RAM 104, main storage device 214, and database 270 may be referred to herein as storage device(s) or memory device(s).

In order to understand the present disclosure certain user terms need to be defined. Individual means a person or entity who wants to disclose their true (identity editor certified) identity to a requestor. Identity server means a computer program that manages access to a centralized resource or service in a network. Identity editor means a person or automated service authorized to perform certain legal formalities, especially to identify an individual, draw up or certify contracts, deeds, and other documents for use in other jurisdictions. A public identifier is a unique invariant data string (such as Social Security Number) which denotes the single individual who is a member of a class of people (such as citizens of a country) that is to be identified individually. Requestor means a person or entity or automated service who wants to verify if the encrypted (identity editor certified) identity matches the public identifier or an automated login server-response challenge, such as a computer program or system that verifies if the encrypted (identity editor certified) public identifier matches the public identifier. A multi factor authentication protocol requires not only a password and username but also something that only that user has on them—such as a physical token (hardware device). U2F means "universal two factor", a specific 2FA encryption standard technical implementation.

Public keys are one half of the mathematically-related pairs consisting of private key and public key pairs in asymmetric encryption for all users. They are managed in a key infrastructure which is a set of roles, policies and procedures needed to create, manage, distribute, use, store and revoke digital certificates (ownership keys) and manage encryption. In our case, the key infrastructure is highly restrictive so that only paired user accounts distribute public keys to each other within identity server, as in paired accounts between an identity editor and an individual who have formed a business relationship in the system for digital identity authentication. Specifically, the key infrastructure manages the identity editor key in order to decrypt the paired individual's public identifier as part of the authentication process.

Asymmetric cryptography, also known as public key cryptography, uses public and private keys to encrypt and decrypt data. The keys are simply large numbers that have been paired together but are not identical (asymmetric). One key in the pair, a public key, can be shared (. The other key in the pair is kept secret; it is called the private key. Either of the keys can be used to encrypt a message; the opposite key from the one used to encrypt the message is used for decryption. When the private key is used for encryption it is typically called "signing". This means others can verify who the person is who 'signed' the message or verify who the person is who 'signed-off on a transaction because they can use the signers' public key to decrypt. If that doesn't work, the individual was not the one who sent the message. The entire message can be encrypted/signed, or, more commonly just the hash is encrypted/signed due to the inefficiency of private key encryption in the case of large messages. A hash is a unique string (e.g. base 64) or (HEX) number that uniquely represents the message. For simplicity, private key encryption in this document may refer to signing hashes as well as complete messages. When the public key is used for encryption it is called "encryption". In this case individual's private key (with hardware token) can be used to decrypt. Hashes can also be used to transform a unique string (like Social Security Number or other identification number) into another unique string without the ability to invert the process.

Moreover, Email Address with Identity String and System or Platform 201 may be utilized to improve, simplify, and facilitate digital identity verification, control, and ownership in a secure and efficient manner between a number of parties.

U2F can also encrypt conditionals (indirectly through a handle). U2F provides 2 factor authorization solves the problem of phishing, cloning. It issues physical devices (which can be replaced) to store private digital keys to all actors. These private keys are then used in the encryption process and they have a 30 s refresh time. So the pins are always changing depending on atomic clock time. This reduces the need to issue new keys often. The private keys are not stored inside of the server, so even in the case of an "inside job" nobody can establish new user/editor pairs. The server is configured to store all the public keys that are paired with the private keys before they are issued to users. Public keys can only be used to decrypt messages.

To the full extent permitted by law, the present United States Provisional patent application incorporates herein by reference in their entirety U.S. Non-Provisional application Ser. No. 16/260,103, filed on Jan. 29, 2019, entitled "System for Digital Identity Authentication and Methods of Use, U.S. Non-Provisional application Ser. No. 16/190,634, filed on Nov. 14, 2018, entitled "System for Digital Identity Authentication and Methods of Use, U.S. Provisional Application No. 62/586,237, filed on Nov. 15, 2017, entitled "Digital Identity Verification & Authentication System and Methods of Use.

Figures 1, 3:
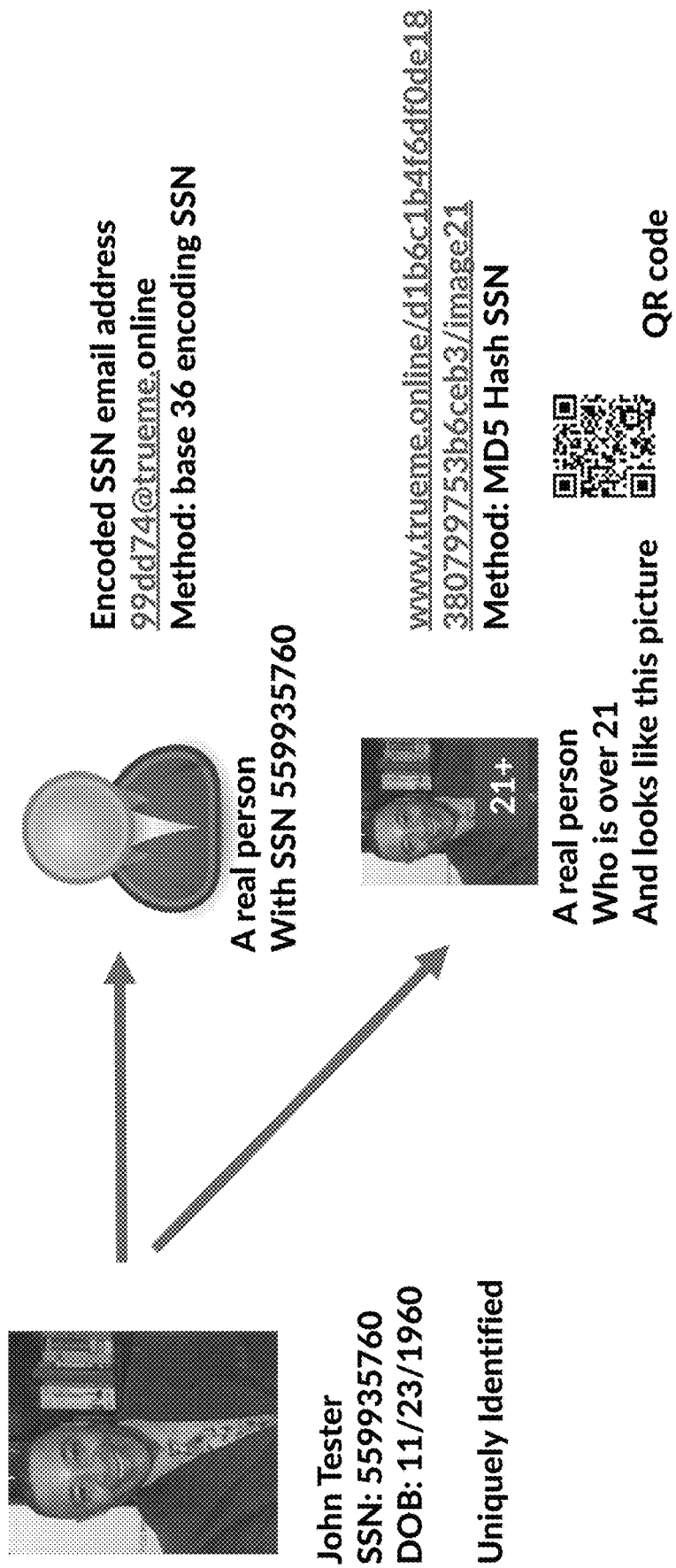
Figures 2, 3:
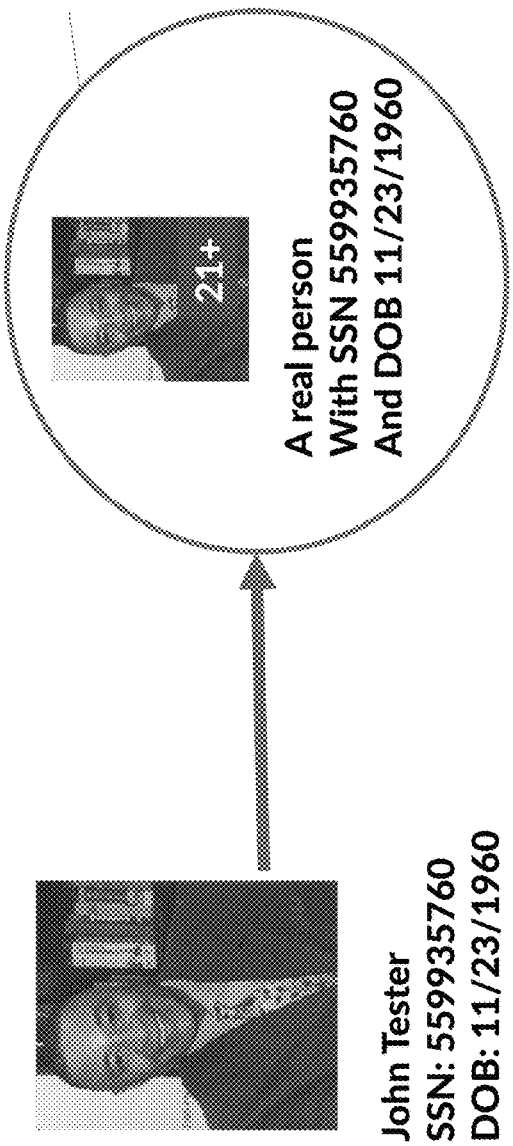
Figure 3:
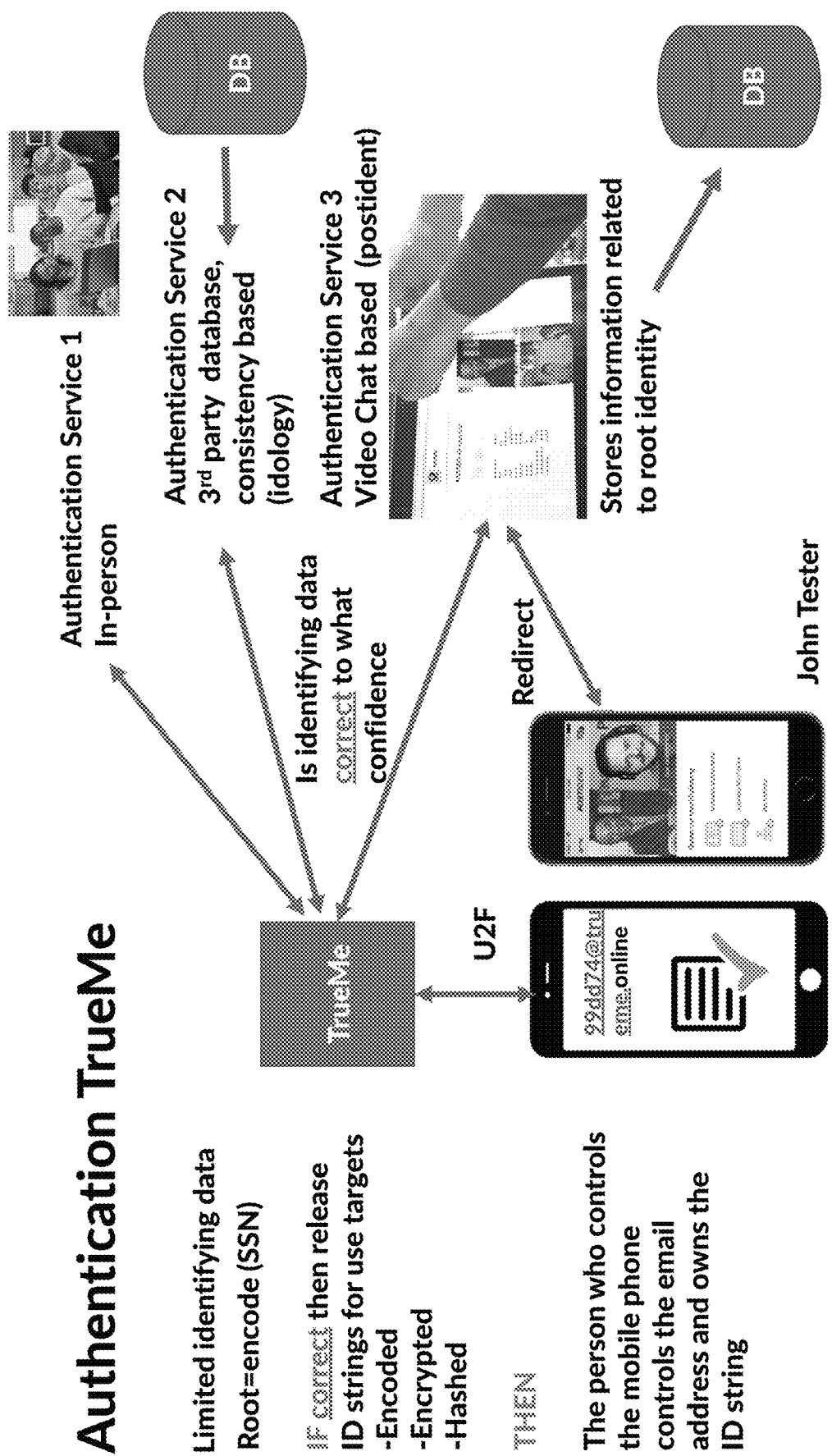

Referring now to FIG. 3, by way of example, and not limitation, there is illustrated a set of instructions for a hardware device, such as computer system 10, a client or user 220, 222, 224 in communication with server system 260 utilizing an authentication protocol and identity authentication service, such as Email Address with Identity String and System or Platform 201 shown in diagrams of FIG. 3. Preferably Email Address with Identity String and System or Platform 201 may be configured as algorithm, software or applications 206 operating and/or executing instructions or operations on computer system 10, user 220, 222, 224 and/or server system 260 for data and email as described above in FIGS. 1-2. Email Address with Identity String and System or Platform 201 ties the email address used as a contact between a third party, such as user 222, 224 to the unique identity string of an individual, user 220. A Social Security Number is an example of a unique identity string or other personal attribute data. Email Address with Identity String and System or Platform 201 may be implemented as an open standard use with a specific email service that leverages this disclosure (e.g. trueme.online).

Referring now to FIG. 3-1, by way of example, and not limitation, there is illustrated an individual John Tester, user 220 with a social security number (SSN) and a date of birth (DOB). John Tester, user 220 SSN has been authenticated and John Tester, user 220 has been assigned an email which is encoded using for example base36 and his SSN. (e.g. 559935760 becomes 99dd74@trueme.online). Trueme.com or trueme.online are authentic email server domains. This means that any target service who knows John Tester, user 220 SSN can contact John Tester, user 220. There is no bi-directional communication between the target service and trueme.online required.

On the basis that the information on the trueme.online service is authenticated, it is now also possible to create hashes that combine the identity string with a type of information. These hashes can now be used as links to display specific information about John Tester, user 220. For instance, if a service scans the hash as a QR code his picture with designation 21+ can be downloaded from the trueme.online server to identify John Tester, user 220 and verify he is of age 21.

It is contemplated herein that identity string or temporary identity string may include SSN, National Identification Number, Drivers License, 9 Digit ZIP Code, Phone number, text messaging number, text message, Credit card number, Insurance card number, 7 digits of DOB, Country Code and the like as shown in FIG. 3-15. Moreover, identity string or temporary identity string may link to other or additional John Tester, user 220 (identity data or account data).

Referring now to FIG. 3-2, by way of example, and not limitation, there is illustrated where Email Address with Identity String and System or Platform 201 discloses that this concept also works with encryption of the email address (1nim80fdz64@trueme.online) wherein the underlying data embedded in the email (1nim80fdz64@trueme.online) is hidden. The encryption key (JTester3) user identity data is made available by John Tester, user 220 to the target service as part of the standard. For example, Email Address with Identity String and System or Platform 201 could for instance use the userid of the target service as the key. In this example the SSN and the DOB numbers are encrypted with a format preserving method (e.g. https://pypi.org/project/pyffx/) with key=userid=JTester3. Next the numbers are base36 encoded which produces the address 1nim80fdz64@trueme.online. The target service can decrypt this information back to the SSN/DOB and with the open standard also retrieve the image from trueme.online.

In cryptography, format-preserving encryption (FPE), refers to encrypting in such a way that the output (the ciphertext) is in the same format as the input (the plaintext). The meaning of "format" varies. The format-preserving encryption may utilize integers followed by a decimal to a hexatrigesimal conversion.

Referring now to FIG. 3-3, by way of example, and not limitation, there is illustrated the integration of the email address (1nim80fdz64@trueme.online) with an authentication service and a hardware device, computer system 10, user 220 via Email Address with Identity String and System or Platform 201. After John Tester, user 220 completes his trueme.online profile, the associated emails addresses, such as (1nim80fdz64@trueme.online) are generated. The device, computer system 10, user 220 that is used to set up the account is matched to the trueme.online server using for example U2F secure communication. The user, such as John Tester, user 220 may be directed to an authentication service such as "Postident" from Deutsche Post. Here the information in the account of John Tester, user 220 is matched to the presented credentials and stored in database 270, and if a match, the trueme email addresses, such as (1nim80fdz64@trueme.online) are released to be used by John Tester, user 220. The authentication service can have various degrees of fidelity, it could be done in person, video, or by checking the consistency of the information.

Figures 3, 4:
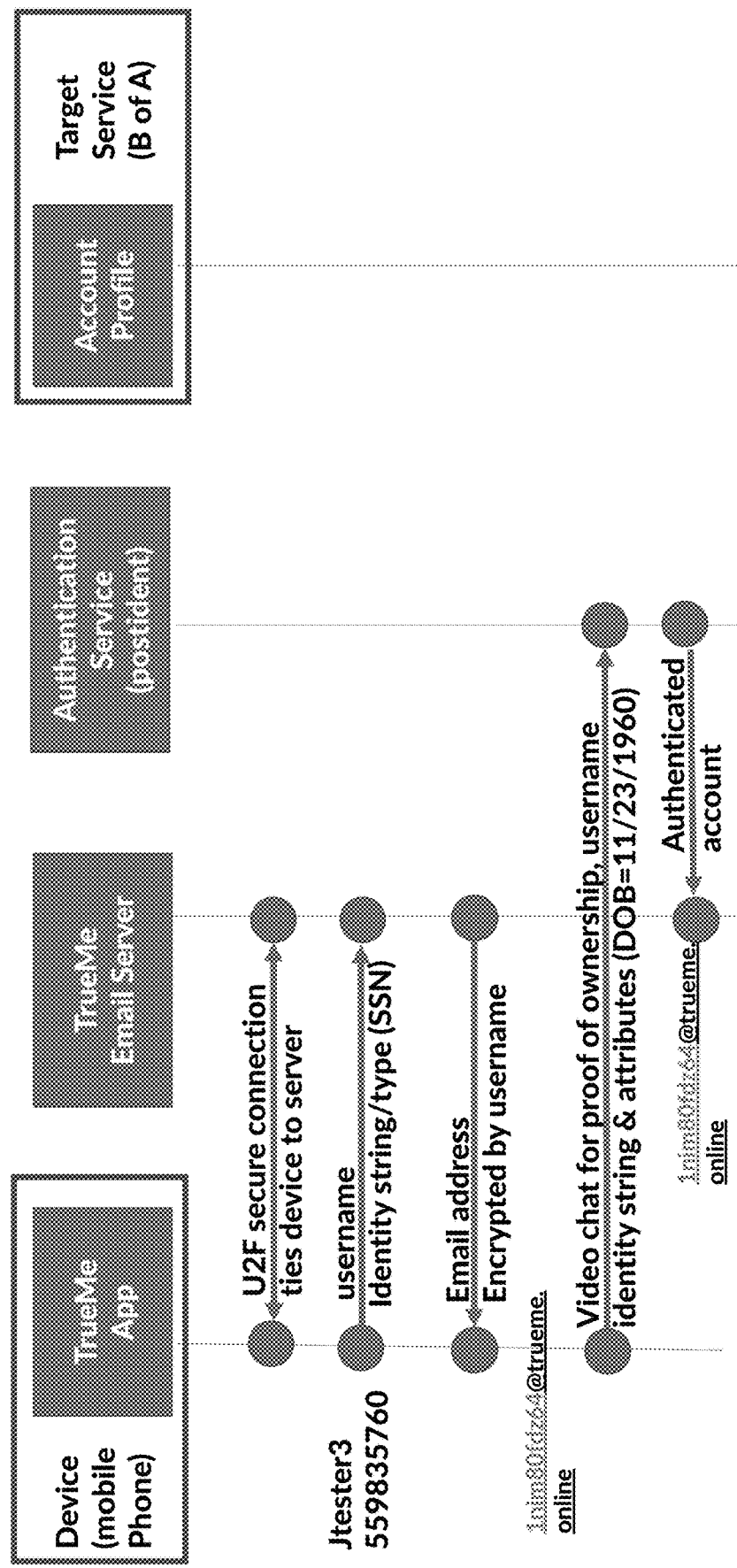

Referring now to FIG. 3-4, by way of example, and not limitation, there is illustrated the user, John Tester, user 220, setup of the Trueme account and the authentication that the email addresses, such as (1nim80fdz64@trueme.online), belong to the end user, John Tester, user 220 via Email Address with Identity String and System or Platform 201. For example, the TrueMe App may be operated on a device, such as a mobile phone, computer system 10, user 220. True Me email server may be operated from server 260. The encryption key (JTester3) is made available by John Tester, user 220 to the target service as part of the standard. For example, Email Address with Identity String and System or Platform 201 could for instance use the userid of the target service as the key. In this example the SSN and the DOB numbers are encrypted with a format preserving method (e.g. https://pypi.org/project/pyffx/) with key=userid= JTester3. Next the numbers are base36 encoded which produces the address 1nim80fdz64@trueme.online. The user, such as John Tester, user 220 may be directed to an authentication service such as "Postident" from Deutsche Post. Here the information in the account of John Tester, user 220 is matched to the presented credentials and stored in database 270, and if a match (authenticated) via video chat, the trueme email addresses, such as (1nim80fdz64@trueme. online) are released to be used by John Tester, user 220 and target service, such as BANK OF AMERICA (B of A).

Figures 3, 4, 5:
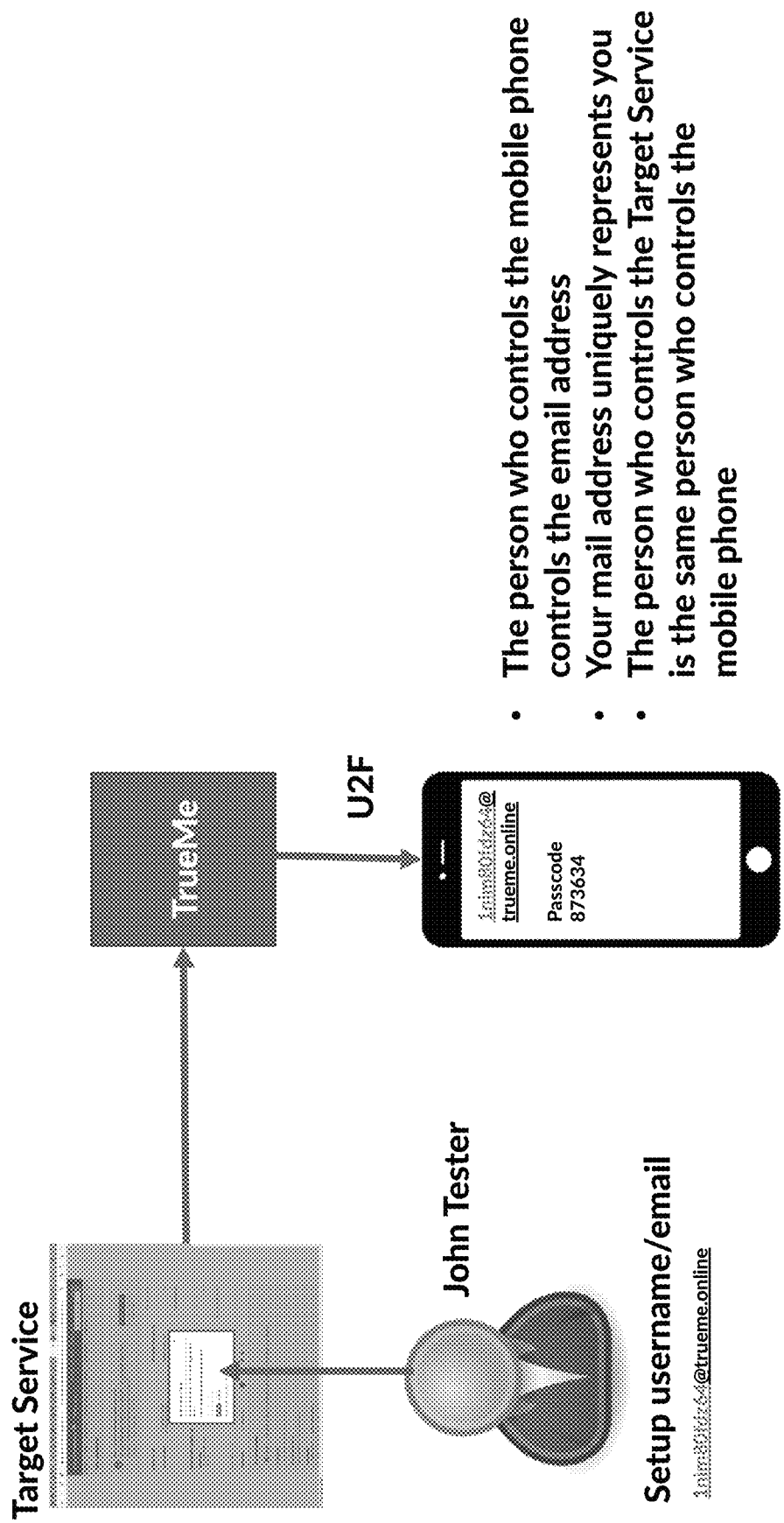

Referring now to FIG. 3-5, by way of example, and not limitation, there is illustrated how a target service, such as BANK OF AMERICA (B of A) verifies the email address via Email Address with Identity String and System or Platform 201. The user, John Tester, user 220 types in his email address and typically receive a passcode via computer system 10, user 220. F FIG. 3-5 discloses how the passcode (873634) is then typed into the target service interface displayed on computer system 10, user 220 for verification. This is a normal verification process of a target service, such as BANK OF AMERICA (B of A).

Referring now to FIG. 3-6, by way of example, and not limitation, there is illustrated a target service, such as BANK OF AMERICA (B of A) verifies email addresses, such as (1nim80fdz64@trueme.online) via Email Address with Identity String and System or Platform 201. John Tester, user 220 types in email addresses, such as (1nim80fdz64@ trueme.online) and receive a passcode (873634) on client dashboard display 208 of computer system 10, user 220. FIG. 3-5 discloses how the passcode (873634) may be typed into the target service interface displayed on computer system 10, user 220 for verification. This is a normal process for target service, such as BANK OF AMERICA (B of A), except that in this case Email Address with Identity String and System or Platform 201 is not only verifying that email addresses, such as (1nim80fdz64@trueme.online) is under control of John Tester, user 220, but also that John Tester, user 220 and on computer system 10, user 220 matches the information in the target account. FIG. 3-5 discloses how this is done using the open standard for the trueme email, Email Address with Identity String and System or Platform 201. FIG. 3-6 discloses that if an identity thief had used the SSN in order to set up a fake account on the target service, the correct end user (true user, John Tester, user 220) would still be notified. True user, John Tester, user 220, would be notified that an identity thief had used SSN trueme.online email (1nim80fdz64@trueme.online) because it is tied to the true owner's device computer system 10, user 220 through U2F. The true user, John Tester, user 220, would also be identified because the target service, such as BANK OF AMERICA (B of A), could simply construct the trueme.online email (1nim80fdz64@trueme.online) from the SSN provided by the identity thief and contact the true user, John Tester, user 220, of the email (1nim80fdz64@trueme.online) before changing or creating an account to email provided by the identity thief.

Referring now to FIG. 3-7, by way of example, and not limitation, there is illustrated a target service, such as BANK OF AMERICA (B of A) process whereby the target service checks the account profile information(s) in its database 270 against the decrypted email address (1nim80fdz64@trueme. online) account information social security number (SSN) and a date of birth (DOB) of John Tester, user 220 without using an API or bidirectional interface via Email Address with Identity String and System or Platform 201.

Referring now to FIG. 3-8, by way of example, and not limitation, there is illustrated a target service, such as BANK OF AMERICA (B of A) discloses the process in the case that a non trueme email (JohnTestersuspect@Hotmail.com) wants to use social security number (SSN) 559935760 via Email Address with Identity String and System or Platform 201. In this case the thief email address (99dd74@trueme. online) could be constructed from a known SSN 559935760 or other identity string. This means that identity thief's who have such information SSN 559935760 can try to spam or do a phishing attacks on Email Address with Identity String and System or Platform 201. Email Address with Identity String and System or Platform 201 compares thief email address (99dd74@trueme.online) against (1nim80fdz64@trueme. online) or other account information and its not John Tester, user 220. John Tester, user 220 is sent an email to email address (1nim80fdz64@trueme.online) that someone wants to open an account at a target service, such as WELLS FARGO. Moreover, since Email Address with Identity String and System or Platform 201 email service on server 260 is very narrowly focused on parsing event information from known target services, target service, such as BANK OF AMERICA (B of A) or WELLS FARGO, it is relatively easy to protect against such attacks or phising with spam filters, such as "@bankofamerica.com" or "@wellsfargo. com".

Referring now to FIG. 3-9, by way of example, and not limitation, there is illustrated a target service, such as BANK OF AMERICA (B of A) performs an online email verification of the user, John Tester, user 220. For example, the TrueMe App may be operated on a device, such as a mobile phone, computer system 10, user 220 via Email Address with Identity String and System or Platform 201. True Me email server 260 may be operated from server 260. John Tester, user 220 using the trueme email addresses, such as (1nim80fdz64@trueme.online), encryption key or user key (JTester3), and John Tester, user 220 password. Email Address with Identity String and System or Platform 201 decrypts trueme email addresses, such as (1nim80fdz64@trueme.online) to find attributes and identity such as date of birth (DOB) Nov. 23, 1960 and social security number (SSN) 559835760 and compares to account information social security number (SSN) and a date of birth (DOB) of John Tester stored in database 270. New email addresses, such as (1nim80fdz64@trueme.online) established for John Tester, user 220.

Referring now to FIG. 3-10, by way of example, and not limitation, there is illustrated a target service, such as BANK OF AMERICA (B of A) performs an online email verification of contact email (JTester@yahoo.com) via Email Address with Identity String and System or Platform 201. For example, the TrueMe App may be operated on a device, such as a mobile phone, computer system 10, user 220. True Me email server 260 may be operated from server 260. JTester, user 222 using contact email (JTester@yahoo.com) attempts to verify that he is, John Tester, user 220. Email Address with Identity String and System or Platform 201 find attributes and identity such as date of birth (DOB) Nov. 23, 1960 and/or social security number (SSN) 559835760 and encodes with contact email (JTester@yahoo.com) to get email addresses, such as (99dd74@trueme.online) and compares to (1nim80fdz64@trueme.online) established for John Tester, user 220.

Referring now to FIG. 3-11, by way of example, and not limitation, there is disclosed whereby Email Address with Identity String and System or Platform 201 is utilized to verify the age of a person (age restricted service), the user, John Tester, user 220, appearing in person in front of the target service, such as a bouncer at a night club or bar. Target service here is only interested in finding out how old the user, John Tester, user 220, is. Target service, on computer system 10 (3$^{rd}$ party scanner), user 224 can scan the bar or QR code from the device, user, John Tester, computer system 10, user 220 which represents the link to Email Address with Identity String and System or Platform 201 and retrieve an image of user, John Tester, user 220 from the trueme.online server 260. Target service can then compare the image to the face of the person in front of them, and if the same (a match) the information age >21 is true as well.

Referring now to FIG. 3-12, by way of example, and not limitation, there is disclosed a sample of the use cases that may be covered by this disclosure and the type of identity string implementation utilized by Email Address with Identity String and System or Platform 201.

Referring now to FIG. 3-13, by way of example, and not limitation, there is disclosed the type of interface implementation of target service needed for these use cases utilized by Email Address with Identity String and System or Platform 201.

Referring now to FIG. 3-14, by way of example, and not limitation, there is disclosed the mapping between individual features and the service function utilized by Email Address with Identity String and System or Platform 201.

Referring now to FIG. 3-15, by way of example, and not limitation, there is disclosed examples of identity string data and verification date that can be used utilized by Email Address with Identity String and System or Platform 201. Such as SSN, National Identification Number, Drivers License, 9 Digit ZIP Code, Phone number, text messaging number, text message, Credit card number, Insurance card number, 7 digits of DOB, Country Code and the like.

Referring now to FIG. 3-16, by way of example, and not limitation, there is disclosed examples of Frequently asked questions and response of functionality of Email Address with Identity String and System or Platform 201.

Referring now to FIG. 3-17, by way of example, and not limitation, there is disclosed examples of Frequently asked questions and response of functionality of Email Address with Identity String and System or Platform 201.

There are two use cases in FIG. 3 that denote person-to-person (P2P) communication rather than person to service. An example of a P2P type communication would be in the case whereby information is disclosed that is non-sensitive to hacking. An example could be your physical address or information regarding your personal attributes (like age) that are not subject to any regulation but is important to the receiver (e.g. online dating scenario or >21). In this case, the sender, user, John Tester, user 220, could use the email address (1nim80fdz64@trueme.online) established for John Tester, user 220, that contains the information, provide the key, encryption key (JTester3) to trueme, Email Address with Identity String and System or Platform 201, and send the information. Trueme, Email Address with Identity String and System or Platform 201, would decrypt the local part of the email (1nim80fdz64@trueme.online), put it in the header, body or signature and send it off. The important aspect is that the receiver would have to trust an email (1nim80fdz64@trueme.online) from trueme, Email Address with Identity String and System or Platform 201. Alternatively, the sender, John Tester, user 220, could provide his key, encryption key (JTester3) through other means (e.g. sms txt message) to the receiver who can then check the data contained in the email address from the sender directly on the trueme server 206, of Email Address with Identity String and System or Platform 201.

In the case of credit card numbers (FIG. 3) and other sensitive information additional security is needed. During email, often the data is transmitted as unencrypted readable text. In that case packet sniffers could capture credit card digits. Here there are three ways to deal with that scenario. The first is that the data from the trueme server 260, Email Address with Identity String and System or Platform 201, is sent as a sms txt. This is much harder to intercept. A second way is to forward the encryption key, encryption key (JTester3). Finally, if both the sender and receiver have a trueme account the sensitive information can be encrypted with the public key of the receiver, since both parties are in contact with each other.

Email Syntax (see reference https://en.wikipedia.org/wiki/Email_address, incorporated herein by reference)

The format of email addresses is local-part@domain where the local-part may be up to 64 characters long and the domain may have a maximum of 255 characters. The formal definitions are in RFC 5322 (sections 3.2.3 and 3.4.1) and RFC 5321—with a more readable form given in the informational RFC 3696[5] and the associated errata, incorporated herein by reference. Note that unlike the syntax of RFC 1034,[6] and RFC 1035[7] there is no trailing period in the domain name.

Local-Part

The local-part of the email address may use any of these ASCII characters:

uppercase and lowercase Latin letters A to Z and a to z;
digits 0 to 9;
printable characters !#$%&'*+-/=?^_'{|}~;
dot ., provided that it is not the first or last character unless quoted, and provided also that it does not appear consecutively unless quoted (e.g. John..Doe@example.com is not allowed but "John..Doe"@example.com is allowed); [8]

With this syntax it is possible to encode 99 numbers from base 10 (digits) to base 36 (digits and letters) in the 64 character string of the local-part of the email address.

Test of encrypted email addresses.

Successful test on BANK OF AMERICA account using the following process (not real numbers)

Steps:
SSN (e.g 559835762), DOB (1123960) so 5598357621123960
Convert to HEX number 13e3ad35552b78
Add flag for type of ID and verification state Flag(ab), so unverified SSN: ab13e3ad35552b78
For example, Encrypt with Blowfish 32 character output key=avdvldn
Blow Fish can be found here—https://webnet77.net/cgi-bin/helpers/blowfish.pl
Result:
BE85D1E256953469C851FA69A424AC53

Also this is 32 characters, email allows up to 64 characters. Also the problem is that (say for Bank) you have to verify the email address by typing it in by hand—32 characters is ok, but 64 characters is useable but may be getting to long for a typical user.

Referring now to FIG. 4, by way of example, and not limitation, there is disclosed setup of John Test Case, user 220 email address BE85D1E256953469C851FA69A424AC53@yahoo.com on yahoo (could be any other email service like gmail). (Note that the figure does not show the whole email in the window). TrueMe would similarly create a similar email for John Test Case, user 220 in the TrueMe service, Email Address with Identity String and System or Platform 201.

Referring now to FIG. 5, by way of example, and not limitation, there is disclosed successful change over by John Test Case, user 220 to email address BE85D1E256953469C851FA69A424AC53@yahoo.com as contact email for John Test Case, user 220 on target service, such as BANK OF AMERICA online banking.

Figures 3, 4, 5, 6:
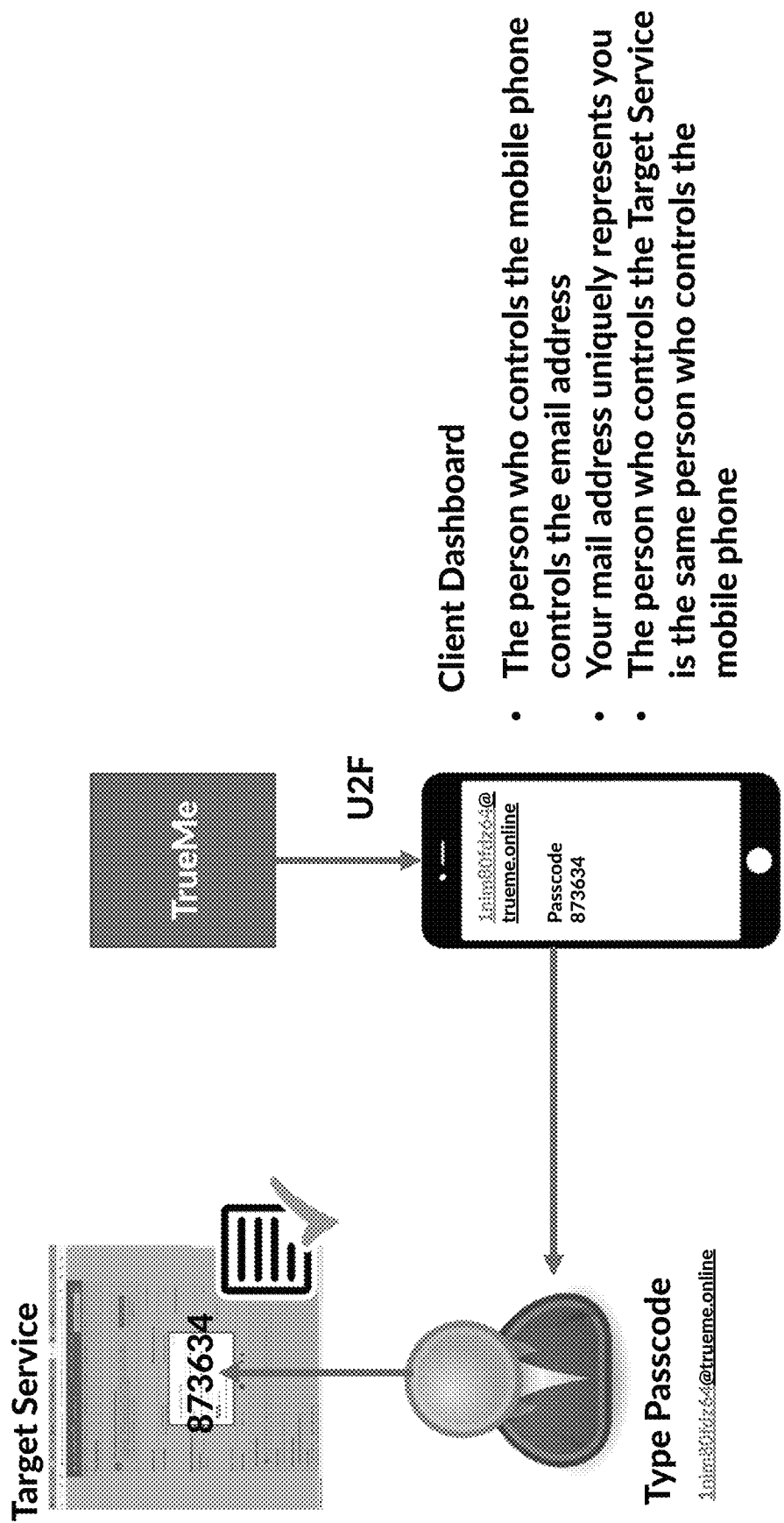
Figures 3, 4, 5, 6, 7, 8, 9:
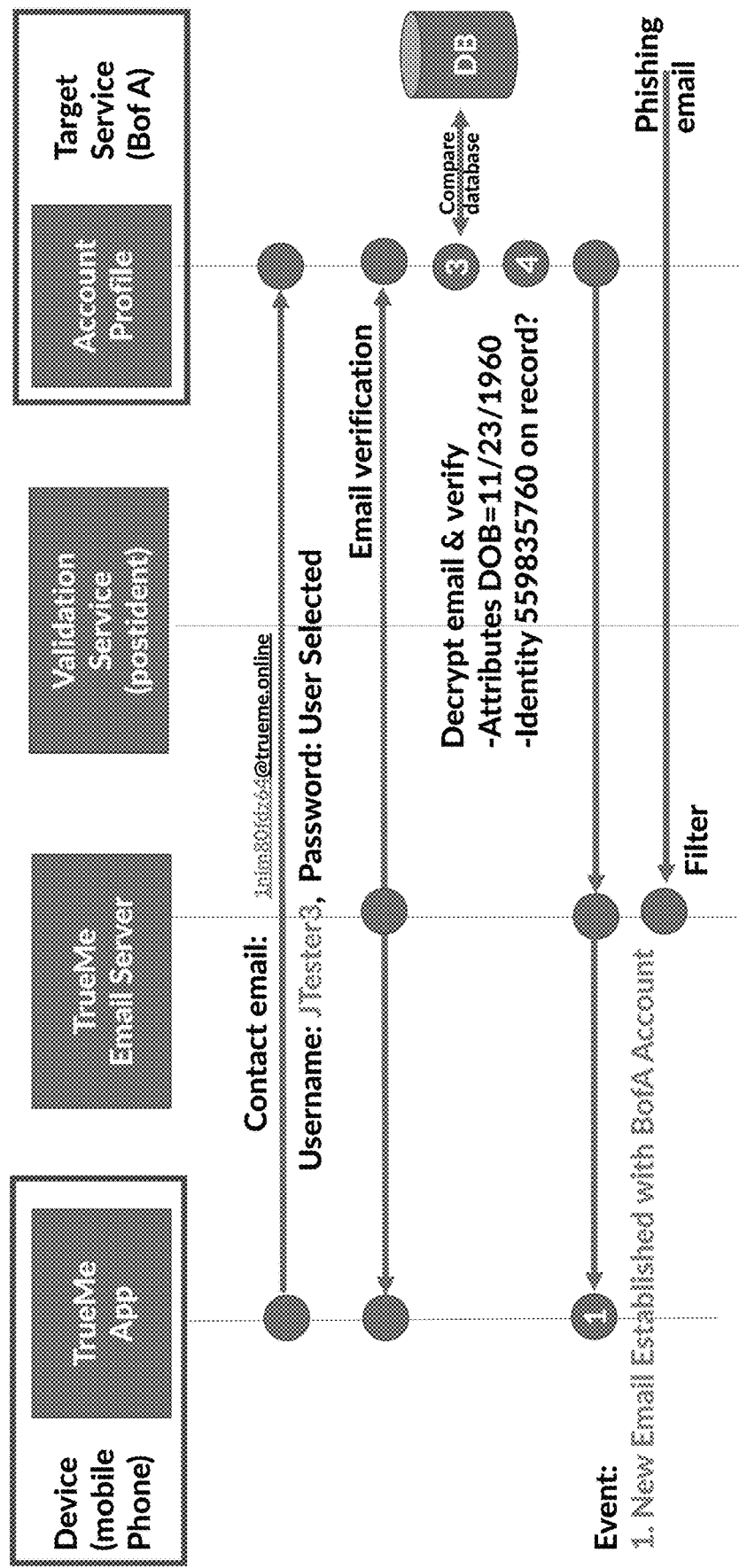
Figures 3, 4, 5, 6, 7, 8, 9, 10:
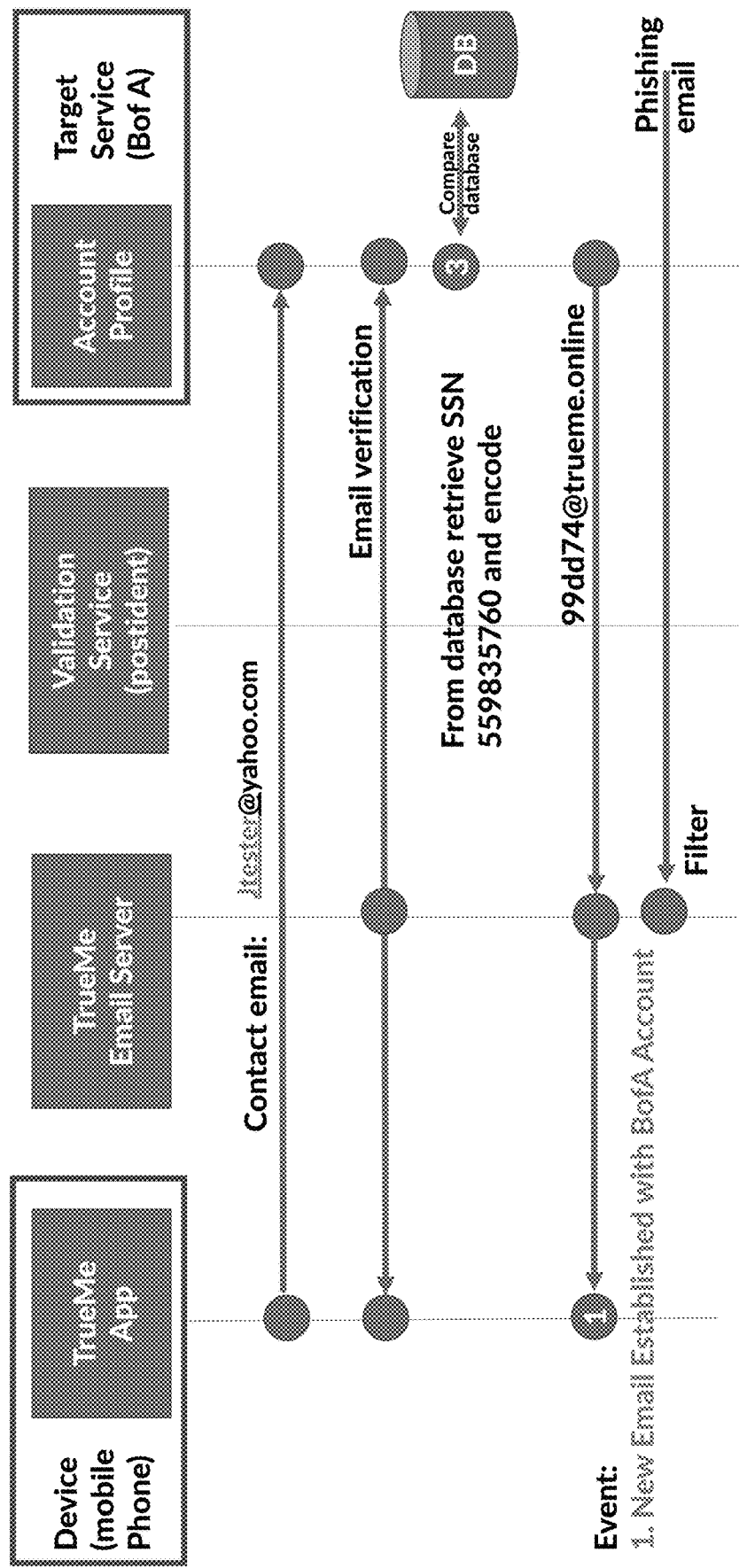
Figures 3, 4, 5, 6, 7, 8, 9, 10, 11:
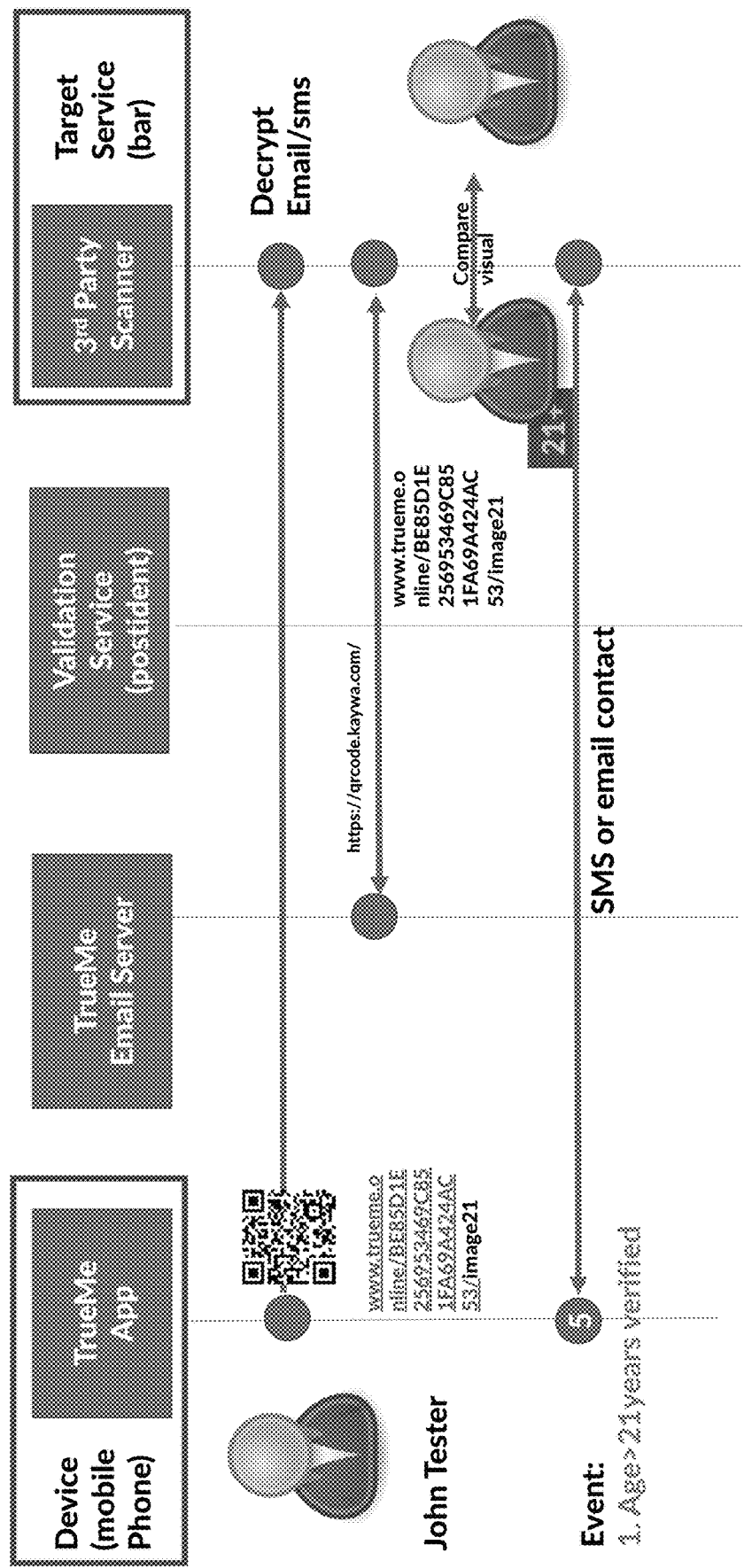
Figure 5:
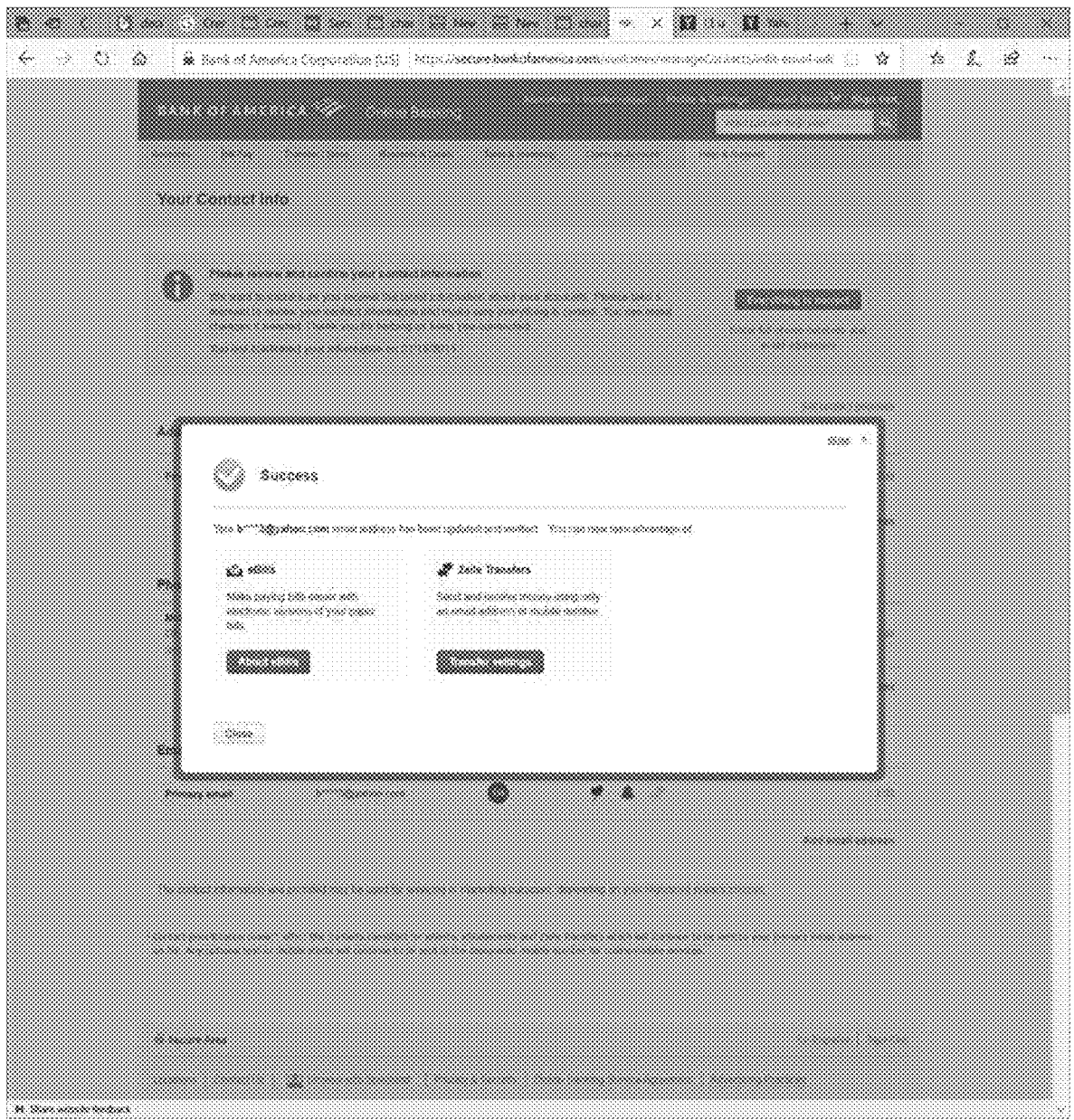
Figure 6:
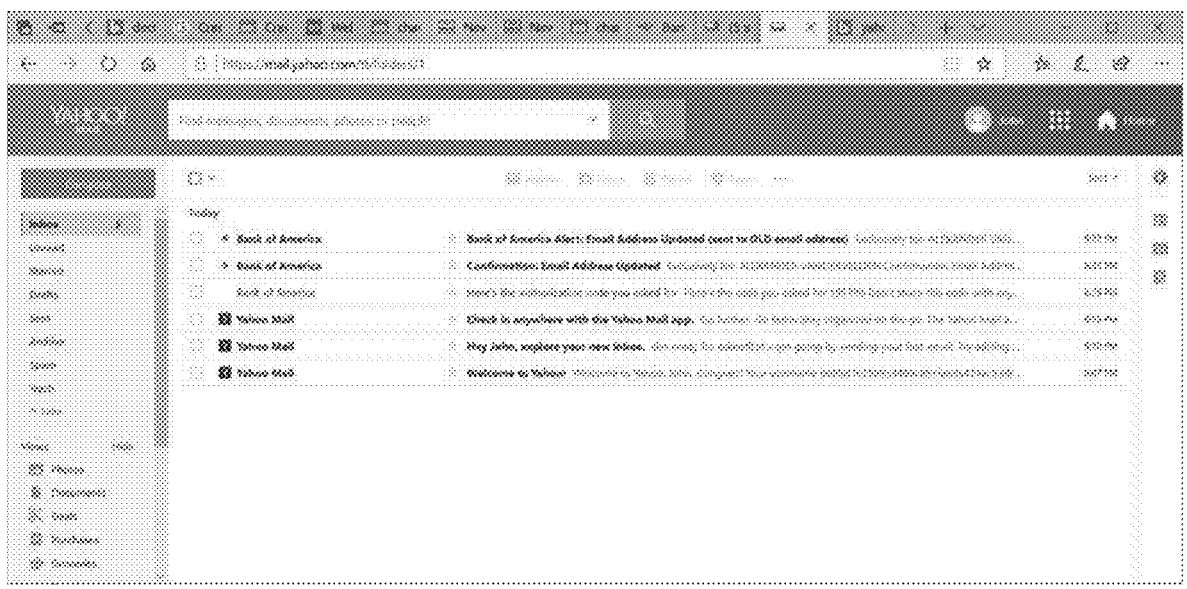

Referring now to FIG. 6, by way of example, and not limitation, there is disclosed a series of email responses from target service, such as BANK OF AMERICA online banking, such as "Confirmation: Email Address Updated" and "Bank of America Alert: Email Address Updated" on my new email account, BE85D1E256953469C851FA69A-424AC53@yahoo.com (service event communication). A similar email was sent to by John Test Case, user 220 previous email account with BANK OF AMERICA online banking for security purposes (service event communication). Other service event communications may include account opening, a login event, a user name, a password change events and the like. It is contemplated herein that BANK OF AMERICA like other target services or John Test Case, user 220 may requiring an identity monitoring service to protect identity.

John Test Case, user 220 also then changed it again back to John Test Case, user 220 previous email account with BANK OF AMERICA and got a similar Warning from my bank on the encrypted yahoo email BE85D1E25695-3469C851FA69A424AC53@yahoo.com. This is the type of event Email Address with Identity String and System or Platform 201 will capture in case of account takeover.

It is contemplated herein that a target service using Email Address with Identity String and System or Platform 201 can also verify the ownership of a credit card online wherein the credit card may replace or be added to the string like SSN.

Spam Filtering:

Target Services, such as BANK OF AMERICA, originated emails have specific email servers with known domains. Emails from authentic domains can be parsed or filtered to allow authentic communications to pass on as emails to users, John Test Case, user 220 and all other email communications blocked as spam and held for holding period in case determined authentic.

In an email click: File, Properties, and review Internet Header

E.g. Bank:

From: "BANK OF AMERICA"<onlinebanking@ealerts.bankofamerica.com>

Received: from [68.232.194.1] ([68.232.194.1:49005] helo=ealerts.bankofamerica.com)

Return-Path: bounce-29_HTML-585239018-1472384-73720-30@bounce.ealerts.bankofamerica.com E.g. Credit Card:

Received: from [52.27.255.238] ([52.27.255.238:49239] helo=mta1a2.c1-t.msyscloud.com)

by smtp15.gate.ord1d.rsapps.net (envelope-from <bounce-400000014073019598@notification.capitalone.com>)

From: "Capital One"<capitalone@notification.capitalone.com>

X-MS-Exchange-Organization-Network-Message-Id: bd6e54af-76fb-4a2a-ac47-08d6c30034de Return-Path: bounce-400000014073019598@notification.capitalone.com X-Spam-Threshold: 95

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The foregoing description and drawings comprise illustrative embodiments of the present disclosure. Having thus described exemplary embodiments, it should be noted by those of ordinary skill in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail; it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

What is claimed is:

1. A system for digital identity authentication, said system comprising:
    a server for data and email;
    a client on a hardware device in communication with said server;
    said server having an authentication protocol to communicate with said hardware device, said authentication protocol having an encryption function having a hardware key and a software key, a private and a public key pair, said key pair generated from said hardware key and said software key, used to encrypt the communication between said server and said client, said encryption function is a format-preserving encryption, said format-preserving encryption utilizes integers followed by a decimal to a hexatrigesimal conversion;
    an identity authentication service to assign a user of said hardware device to an identity string, and creates a unique user email address based on said identity string and an authentic email server domain, said identity string is encrypted with a key; and
    a target service having a user identity data and comparing said user identity data to an email string, and if said user identity data and said email string match, then said target service accepts said unique user email address to send a service event communication to said hardware device.

2. The system of claim 1, wherein said identity string is a country code and a national identification number.

3. The system of claim 1, wherein said identity string is a temporary identity string, said temporary identity string is a driver's license or phone number.

4. The system of claim 1, wherein said identity string links to additional identity data on said authentic email server domain.

5. The system of claim 1, wherein a personal attribute data is added to said identity string.

6. The system of claim 1, wherein said key is generated from an account data provided by said user to said target service.

7. The system of claim 1, wherein said service event communications are selected from the group including an account opening, a login event, a user name, a password change events and combinations thereof.

8. The system of claim 1, wherein said server provides anti-phishing screening of said service event communications from a service requiring an identity monitoring.

9. The system of claim 1, wherein said hardware device displays said service event communications from said target service requiring said identity monitoring on a client dashboard.

10. The system of claim 1, wherein said user registers a text messaging number with said target service and said server integrates a text communication with said client.

11. The system of claim 1, wherein said target service is an age restricted service.

12. The system of claim 1, wherein said key is deleted after completion of said identity authentication service.

13. A computer implemented method for digital identity authentication, said method comprising the steps of:
providing a server for data and email, a client on a hardware device in communication with said server, said server having an authentication protocol to communicate with said hardware device, said authentication protocol having an encryption function having a hardware key and a software key, a private and a public key pair, said key pair generated from said hardware key and said software key, used to encrypt the communication between said server and said client, said encryption function is a format-preserving encryption, said format-preserving encryption utilizes integers followed by a decimal to a hexatrigesimal conversion;
utilizing an identity authentication service to assign a user of said hardware device to an identity string, said identity string is encrypted with a key;
creating a unique user email address based on said identity string and an authentic email server domain;
enabling a target service to access a user identity data;
comparing said user identity data to an email string by said target service, and if said user identity data and said email string match; and
accepting said unique user email address to send a service event communication via said target service to said hardware device.

14. The method of claim 13, wherein said identity string is a country code and a national identification number.

15. The method of claim 13, wherein said identity string is a temporary identity string, said temporary identity string is a driver's license or phone number.

16. The method of claim 13, wherein said identity string links to additional identity data on said authentic email server domain.

* * * * *